(12) United States Patent
Zhu et al.

(10) Patent No.: US 10,043,151 B1
(45) Date of Patent: Aug. 7, 2018

(54) LOCKER-BASED LOGISTICS MANAGEMENT SYSTEM

(71) Applicant: Zipcodexpress, Inc., Pflugerville, TX (US)

(72) Inventors: Yonghui Richard Zhu, Austin, TX (US); Rongchuan Zheng, Austin, TX (US)

(73) Assignee: Zipcodexpress, Inc., Austin, TX (US)

( * ) Notice: Subject to any disclaimer, the term of this patent is extended or adjusted under 35 U.S.C. 154(b) by 0 days.

(21) Appl. No.: 15/724,769

(22) Filed: Oct. 4, 2017

Related U.S. Application Data

(60) Provisional application No. 62/544,099, filed on Aug. 11, 2017, provisional application No. 62/520,696, filed on Jun. 16, 2017.

(51) Int. Cl.
*G06Q 10/08* (2012.01)
*G06K 19/06* (2006.01)

(52) U.S. Cl.
CPC ... *G06Q 10/0836* (2013.01); *G06K 19/06037* (2013.01)

(58) Field of Classification Search
CPC ............. G06Q 10/0836; G06Q 10/083; G07C 9/00571; G07F 17/12
See application file for complete search history.

(56) References Cited

U.S. PATENT DOCUMENTS

| 2004/0164847 | A1* | 8/2004 | Hale | A47G 29/141 340/5.73 |
| 2004/0199284 | A1* | 10/2004 | Hara | G07C 9/00103 700/215 |
| 2007/0192191 | A1* | 8/2007 | Neal | G06Q 10/08 705/14.26 |
| 2014/0035721 | A1* | 2/2014 | Heppe | G07C 9/00912 340/5.54 |

(Continued)

FOREIGN PATENT DOCUMENTS

| CN | 101814215 | 8/2010 |
| CN | 104574685 A | 4/2015 |

(Continued)

OTHER PUBLICATIONS

Cleveron SnapLocker, published at www.cleveron.eu/snaplocker on May 7, 2017, pp. 1-6 and 8. (Year: 2017).*

*Primary Examiner* — Brian M Epstein
(74) *Attorney, Agent, or Firm* — Lee & Hayes, PLLC

(57) ABSTRACT

Technologies are described related to the delivery of items utilizing electronic locker arrangements. Systems described herein coordinate and manage the delivery of items by large numbers of couriers using a network of electronic locker arrangements. Implementations are described corresponding to couriers delivering items between electronic locker arrangements without the use of a distribution hub. In certain implementations, delivery of items is consolidated to electronic locker arrangements that include a number of lockers. This can increase security and privacy by eliminating the (Continued)

need to know a recipient's address in order to deliver an item. The system can notify a recipient that an item is available for pickup at a nearby electronic locker arrangement. Authentication techniques are described to enable the secure access to electronic locker arrangements that are storing items for delivery.

20 Claims, 13 Drawing Sheets

(56) References Cited

U.S. PATENT DOCUMENTS

| | | | |
|---|---|---|---|
| 2014/0258168 A1* | 9/2014 | Crawford | G06Q 10/0836 705/339 |
| 2014/0297470 A1* | 10/2014 | Ramadge | G06Q 30/0613 705/26.41 |
| 2014/0330603 A1* | 11/2014 | Corder | G06Q 10/0631 705/7.12 |
| 2015/0178778 A1* | 6/2015 | Lee | G06Q 30/0261 705/14.58 |
| 2015/0186840 A1* | 7/2015 | Torres | A47B 81/00 705/339 |
| 2016/0025549 A1* | 1/2016 | Motoyama | G01G 19/414 177/1 |
| 2016/0133075 A1* | 5/2016 | Amdahl | G07C 9/00912 340/5.51 |
| 2016/0216106 A1* | 7/2016 | Motoyama | G01B 11/28 |
| 2016/0275449 A1* | 9/2016 | Hara | G06Q 10/0836 |
| 2017/0124510 A1* | 5/2017 | Caterino | G07C 9/00896 |
| 2017/0220976 A1* | 8/2017 | Schmidt | G06Q 10/083 |
| 2017/0262800 A1* | 9/2017 | Dorpfeld | G06Q 10/0836 |
| 2017/0353943 A1* | 12/2017 | Skaaksrud | H04W 76/10 |

FOREIGN PATENT DOCUMENTS

| | | | | |
|---|---|---|---|---|
| JP | 2003166370 | * | 6/2013 | G07F 17/12 |
| WO | WO03056490 A1 | | 7/2003 | |
| WO | WO2010077129 A2 | | 7/2010 | |
| WO | WO2015100390 A1 | | 7/2015 | |

* cited by examiner

LOCKER-BASED LOGISTICS MANAGEMENT SYSTEM

PRIORITY CLAIM AND CROSS-REFERENCE

This application claims priority to U.S. Provisional Patent Application No. 62/520,696 filed on Jun. 16, 2017, and entitled "Methods and solutions for a smart locker-based shared access and goods logistics" and U.S. Provisional Patent Application No. 62/544,099 filed on Aug. 11, 2017, and entitled "Method and solutions to establish a smart locker-based shared access and good receiving and delivery logistics" both of which are incorporated herein in their entirety.

BACKGROUND

Various service providers enable a sender, such as an individual or entity (e.g., business, educational institution, government institution, etc.), to have one or more items delivered to a recipient that includes another individual or entity. Typically, the service providers utilize a fleet of vehicles to deliver an item directly to an individual or entity. The service providers operate distribution hubs that aggregate items for a particular region and vehicles of the service provider obtain items from the distribution hubs and deliver them to a specific location of the recipient (e.g., business address, residential address).

DETAILED DESCRIPTION

Figure 1:
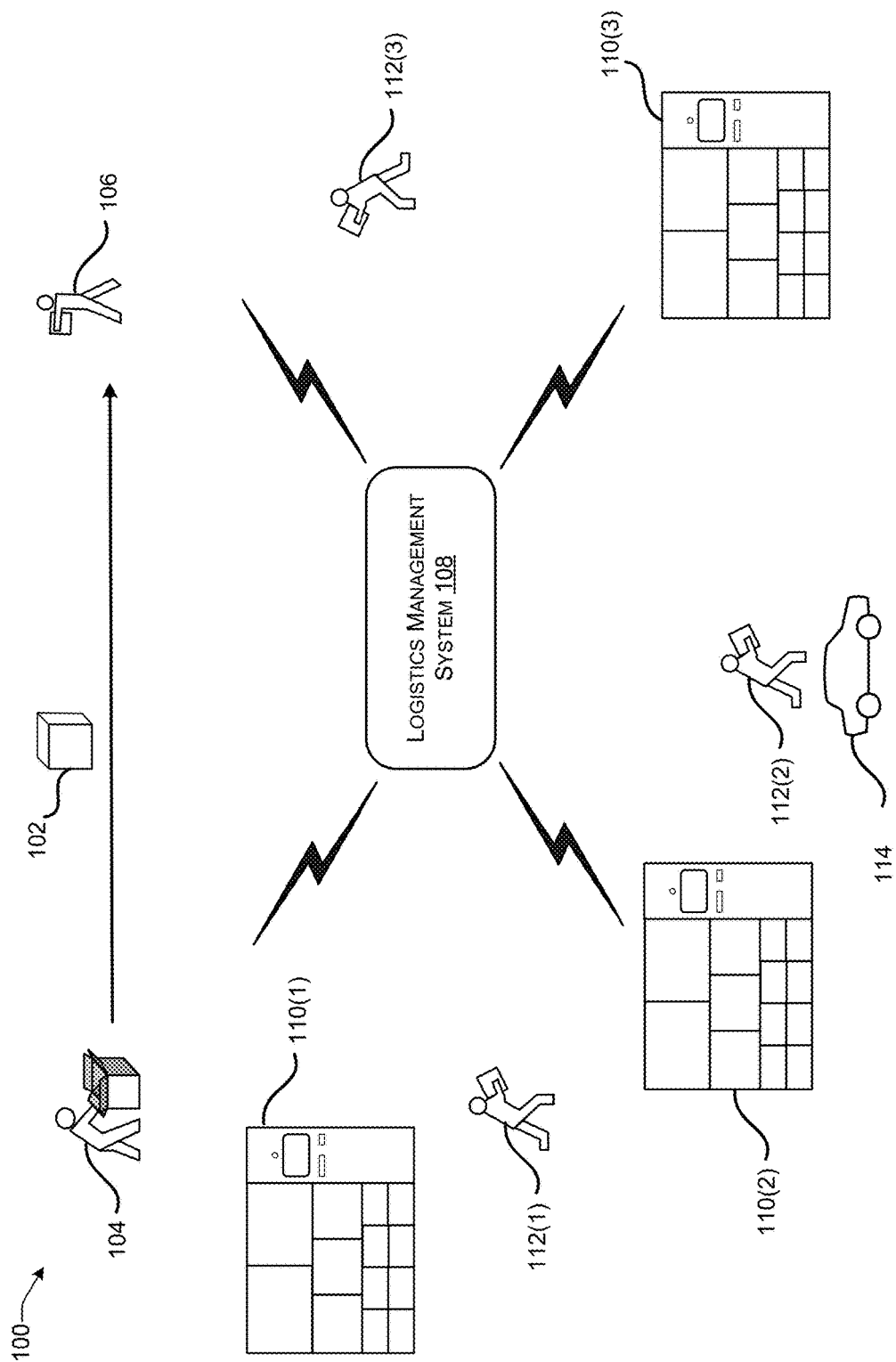
FIG. 1 is a diagram of an architecture to facilitate the delivery of an item from a sender to a recipient by a logistics management system using an electronic locker arrangement according to some implementations.

The following detailed description is directed to technologies for implementing a logistics management system to provide secure delivery of an item to a recipient from a sender. In some cases, the delivery of the item may take place via a courier. The logistics management system can communicate with the sender, the recipient, and the courier via an application executing on computing devices of the sender, recipient, and the courier. An electronic locker arrangement that includes one or more lockers can be used to store the item during the delivery process.

Conventional item delivery systems and processes are inefficient and can lack a level of security that can be desired by senders and recipients of items. In particular, typical logistics companies maintain a fleet of vehicles that deliver items directly to individuals. The items are often dropped off with individuals whose identity is not verified, except by a general question regarding the last name of the individuals. In some cases when an individual is not present to receive an item, the item is dropped off at a location and left outside of a residence or business or left with a neighboring residence or business. In these scenarios, the items being delivered can easily be obtained by someone who is not the intended recipient without a credible means of identifying the individual that actually received the item. In other situations when an individual is not present to receive an item, delivery of the item can be delayed until another time when the delivery person is scheduled to be in the vicinity of the location of the recipient or until a recipient can drive to a physical location where the item is being held. In these instances, it can be inconvenient for an individual to actually obtain the item being sent to them.

Implementations described herein are different from systems utilized by conventional logistics service providers. In particular, implementing the systems and processes described herein eliminates the need for a service provider to maintain a dedicated fleet of vehicles. For example, utilizing a locker-to-locker delivery arrangement with a number of independent couriers eliminates the intermediate distribution hub that is utilized by conventional logistics service providers to deliver items. Additionally, the use of electronic locker arrangements to store items that are to be picked up and dropped off eliminates the delivery of items to an address dedicated to the recipient. The implementations described herein also provide secure drop off and delivery of items to recipients via electronic locker arrangements. The differences between the systems and processes described herein and conventional logistics and delivery systems results in technical differences with the conventional systems. In particular, the implementations described in this application are able to obtain requests to deliver items and process them relatively quickly with respect to conventional systems that deliver items via a set of routes on a daily basis because the items do not need to traverse the physical infrastructure of conventional systems, such as a distribution hub and a fleet of delivery vehicles, in order to be delivered to a recipient. Thus, the implementations described herein utilize a mobile app and/or website to obtain requests to deliver items and also to notify couriers of items that have been requested for delivery in real-time or near real-time.

Further, eliminating a distribution hub and implementing locker-to-locker deliveries causes the systems and methods described herein to differ from conventional systems in the processes and algorithms utilized due to the differences in the architectures. In particular, implementations described herein utilize authentication and identity verification processes that are different from other logistics service providers and are different from other locker-based delivery systems. These different authentication and identity verification processes provide improved security over conventional systems. Additionally, the processes described in implementations differ from conventional logistics systems and locker-based delivery systems by controlling the assignment and access to lockers by couriers, senders, and recipients that conventional systems do not need to implement and/or are unable to implement. These processes represent improvements over the conventional industry practice by enabling the assignment of lockers and couriers to deliver items within minutes or seconds and enables faster delivery times from the time that a request was received that are not possible with conventional hub-based logistics systems that utilize a fleet of vehicles that have assigned routes and traditional locker-based systems, which are simpler and less complex that the implementations described herein.

The implementations of the logistics management system described herein are also different from conventional systems because the logistics management systems described herein track the lockers that are available and unavailable for storing items to be delivered. Thus, the logistics management systems are configured to track the use of lockers for the delivery of items and identify lockers that are available to store items related to new requests for delivery in real-time to provide efficient use of the lockers. The logistics management systems described herein also utilize authentication techniques that restrict access to the lockers by individuals, track the individuals accessing the lockers, and monitor the location of the items based on information provided by the electronic locker arrangements to the logistics management system. Thus, in contrast to conventional systems, items can be accurately tracked and securely stored until individuals arrive to pick up their items. delivered to individuals and of lockers.

Further, the techniques described herein represent additional improvements with respect to conventional systems. In particular, the systems and methods described herein include the implementation of complex algorithms that manage and coordinate the delivery of hundreds, up to thousands of items at a given time by hundreds, up to thousands of couriers. The systems and methods described herein also control access to electronic locker arrangements that enables the secure delivery of items to large numbers of couriers, recipients, and senders of items. The techniques described herein can manage and coordinate the many different facets of the logistic management system and control the dynamic manner in which a large number of items are being delivered at a given time in an efficient and secure manner that is not able to be obtained by conventional systems because conventional systems are more simplified in nature and are not associated with managing, controlling, and coordinating the delivery of such a large number of items via such a large number of couriers for a given geographic location.

In particular implementations, a first individual, the sender, can request to send an item to an additional individual, the recipient, utilizing a web site, a mobile app, or both. The individual sending the item can provide information about the item being sent via the web site and/or mobile app. In some cases, the information about the item can include a text description of the item, one or more images of the item, video of the item, dimensions of the item, weight of the item, combinations thereof, and the like. Additionally, the individual sending the item can provide payment for the delivery of the item to the recipient via the web site and/or the mobile app.

A logistics management system can receive the information about the item to be delivered to the recipient and determine one or more electronic locker arrangements that can be utilized to deliver the item to the recipient. In some cases, a single electronic locker management arrangement can be used to deliver the item to the recipient. In other situations, multiple electronic locker arrangements can be utilized to deliver the item to the recipient. In cases where a single electronic locker arrangement is used to deliver the item to the recipient, the logistics management system can identify the electronic locker arrangement for both the sender to drop off the item and for the recipient to pick up the item. Additionally, in instances where multiple electronic locker arrangements are used to deliver the item, the logistics management system can identify a first locker for the sender to drop off the item and a second locker for the recipient to pick up the item.

In various implementations, the electronic locker arrangement(s) utilized to provide the item to the recipient can be identified by the logistics management system based at least partly on a location of the sender of the item and a location of the recipient of the item. For example, the logistics management system can identify one or more electronic locker arrangements for the delivery of the item to the recipient that are proximate to the sender and the recipient. In some cases, the logistics management system can identify one or more locker arrangements for the delivery of the item to the recipient that are within a threshold distance of the sender and/or the recipient. In particular implementations, zip codes or other geographic designations can be utilized to identify one or more electronic locker arrangements for delivery of the item to the recipient. In an illustrative example, the logistics management system can identify a first electronic locker arrangement located in a zip code of the sender for the item to be dropped off and a second electronic locker arrangement in a zip code of the recipient for the item to be picked up. In scenarios where the sender and the receiver are in the same zip code, in certain implementations, the same electronic locker arrangement can be utilized for dropping off the item by the sender and picking up the item by the recipient.

In implementations that utilize multiple electronic locker arrangements to deliver the item to the recipient, one or more couriers can transport the item between the electronic locker arrangements. The logistics management system can determine that an item is to be delivered to a recipient and identify a number of candidate couriers to deliver the item to the recipient. In some cases, the logistics management system can identify candidate couriers based on locations of couriers relative to the location of the sender, the location of the recipient, or both. Additionally, the logistics management system can identify candidate couriers based on a number of items that that the couriers are already committed to delivering to other recipients. In additional situations, the logistics management system can identify candidates to deliver the item based on metrics of the couriers, such as on-time delivery percentage, number of items previously delivered, damage to items delivered, combinations thereof, and so forth. Further, the logistics management system can identify candidate couriers to deliver the item based on couriers that have provided status information to the logistics management system indicating that the couriers are available to pick up and drop off items in the location of the sender and the location of the recipient. After identifying a number of candidate couriers to deliver the item, the logistics management system can broadcast a message to the candidate couriers that the item is available for delivery. The message can include locations for pickup and delivery of the item. The logistics management system can then obtain notifications of acceptance from one or more of the candidate couriers and determine a particular candidate courier to deliver the item to the recipient.

Access to electronic locker arrangements can be implemented according to authentication processes to verify the identities of individuals requesting access to the electronic locker arrangements. In some implementations, an identifier that uniquely identifies the individual can be generated and provided to the individual. The identifier can then be utilized by the individual to gain access to an item stored by an electronic locker arrangement. In various implementations, the identifier can be encoded by a Quick Response (QR) code. In particular implementations, the QR codes can be utilized by couriers to pick up items for delivery and by recipients to pick up items that have been sent to them. In additional implementations, bar codes identifying items to be delivered can be used to obtain access to the electronic locker arrangements. For example, bar codes can be utilized by senders to access the electronic locker arrangements to store an item in a locker for delivery to a recipient. In other examples, bar codes can be utilized by couriers to drop off items in a locker that are to be picked up later by the recipients.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. In particular, the configurations described herein can be practiced in distributed computing environments where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a diagram of an architecture 100 to facilitate the delivery of an item 102 from a sender 104 to a recipient 106 by a logistics management system 108 using an electronic locker arrangement 110 according to some implementations. In some cases, the item 102 can be included in a container or other type of packaging. The item 102 can include goods obtained from a retailer or manufacturer. The item 102 can also include food or other perishable articles. Further, the item 102 can include non-perishable articles. Additionally, the item 102 can have a number of different weights and sizes.

The sender 104 can include an individual that wants to have the item 102 sent to the recipient 106. In some cases, the sender 104 can be a representative of an entity, such as an employee of a company, that sends the item 102 to the recipient 106 on behalf of the entity. In other cases, the sender 104 can be acting in an individual capacity to send the item 102 to the recipient 106. The recipient 106 can also be a representative of an entity that receives the item 102 on behalf of the entity. In addition, the recipient 106 can receive the item 102 in their individual capacity.

The logistics management system 108 can control the flow of information within the architecture 100 to enable the delivery of the item 102 from the sender 104 to the recipient 106. That is, the logistics management system 108 can obtain a request from the sender 104 to deliver the item 102 to the recipient 106 and identify electronic locker arrangements 110 that can be utilized to store the item 102 during the delivery process. The logistics management system 108 can also identify one or more couriers, such as couriers 112(1), 112(2), 112(3), that can transport the item 102 between the sender 104 and the recipient 106. The logistics management system 108 can communicate with the sender 104, the recipient 106, and the courier 112 to coordinate the pickup and drop off of the item 102 by the sender 104, the recipient 106, and optionally by one or more couriers 112, to one or more of the electronic locker arrangements 110 such that the item 102 can be delivered to the recipient. 106.

The electronic locker arrangements 110 can include a number of lockers that can store items to be delivered from senders to recipients. The lockers can have varying dimensions such that some lockers can hold items that are larger than other items stored by smaller lockers. In some cases, the lockers can be refrigerated to store food or other items (e.g., electronics) that can be damaged by heat. The electronic locker arrangements 110 can also include a number of input/output devices to provide information and/or communications to users of the electronic locker arrangements 110. For example, the electronic locker arrangements 110 can include one or more display devices, one or more microphones, one or more speakers, or combinations thereof. The electronic locker arrangements 110 can also include computing resources, such as one or more processors, one or more memory devices, communication interfaces, and so forth to send, receive, and process electronic information. In particular, the electronic locker arrangements 110 can provide a number of user interfaces to enable individuals to access the lockers of the electronic locker arrangements 110 to drop off or pickup items stored in the lockers of the electronic locker arrangements 110. The electronic locker arrangements 110 can also include additional systems to open and/or close the lockers, sensors to determine that items have been stored in or removed from the lockers, cameras to obtain images and/or video, biometric devices to identify individuals accessing the lockers, and the like.

In particular implementations, the electronic locker arrangements 110 can be in electronic communication with the logistics management system 108. In some implementations, the electronic locker arrangements 110 can be in communication with each other. In still other implementations, the electronic locker arrangements 110 can be in communication with applications executing on mobile devices of senders, recipients, and couriers that are involved in the delivery of items. Although the architecture 100 of FIG. 1 shows three representative electronic locker arrangements 110(1), 110(2), and 110(3), the architecture 100 can include fewer than three electronic locker arrangements or more than three electronic locker arrangements.

In some cases, the electronic locker arrangements 110 can be associated with a particular region and can store items to be delivered within that particular region. In an illustrative example, individual locker arrangements 110 can be associated with a corresponding zip code. In this way, items being delivered to recipients located in a particular zip code can obtain the items from a particular locker arrangement 110. Additionally, senders associated with a particular zip code can drop off items for delivery at an electronic locker arrangement associated with the zip code of the senders. In situations where senders and recipients of items are in different zip codes, couriers 112 can transport the item from an electronic locker arrangement 110 located in the zip codes of the senders to different electronic locker arrangements 110 located in the zip codes of the recipients.

In an illustrative implementation, the logistics management system 108 can receive a request from the sender 104 to deliver the item 102 to the recipient 106. The logistics management system 108 can receive the request via a mobile app executed by an electronic device of the sender 104. The logistics management system 108 can also receive the request via a website administered by or on behalf of the logistics management system 108. Additionally, the logistics management system 108 can receive the request to deliver the item 102 from an electronic locker arrangement 110. The request can indicate information related to the recipient 106. In some cases, the request can indicate a location of the recipient 106. In particular implementations, the request can indicate a region in which the recipient 106 is located, such as a zip code, without specifying an address of the recipient 106. Further, the request can indicate an identifier of the individual, such as a phone number, an email address, a name, an identification number, combinations thereof, and the like.

A request to deliver the item 102 to the recipient 106 can also indicate information related to the item 102. To illustrate, the request can indicate dimensions of the item 102, such as a length of the item 102, a width of the item 102, a height of the item 102, a diameter of the item 102, a volume of the item 102, or combinations thereof. The request can also indicate a weight of the item 102. Further, the request can indicate a description of the item 102. That is, the request can indicate a category associated with the item 102, such as electronic device, food, consumer good, toys, furniture, etc. In addition, the request can indicate whether an item is fragile, perishable, and so forth.

After receiving the request from the sender 104 to deliver the item 102 to the recipient 106, the logistics management system 108 can identify one or more electronic locker arrangements 110 that can be utilized to provide the item 102 to the recipient 106. In some implementations, a single electronic locker arrangement 110 can be utilized to provide the item 102 to the recipient 106. In these situations, the sender 104 can drop off the item 102 in a locker of an electronic locker arrangement 110, such as the electronic locker arrangement 110(1), and the recipient 106 can pick up the item 102 from the same locker. In other cases, multiple locker arrangements 110 can be utilized to provide the item 102 to the recipient 106. For example, the item 102 can be dropped off by the sender 104 at the electronic locker arrangement 110(1) and the item 102 can be picked up by the recipient 106 at the electronic locker arrangement 110(2).

In situations where an item is to be transported between electronic locker arrangements 110, the logistics management system 108 can determine one or more couriers 112 to transport the item from one electronic locker arrangement 110 to an additional electronic locker arrangement 110. In particular, the logistics management system 108 can determine a number of candidate couriers from among a larger pool of couriers based on one or more criteria. In some cases, the logistics management system 108 can identify candidate couriers to transport items between electronic locker arrangements 110 based at least partly on proximity of the couriers to a pickup location or a drop off location. The logistics management system 108 can also determine candidate couriers to transport items between electronic locker arrangements 110 based at least partly on an experience level of the couriers, such as a number of deliveries previously completed, and/or on performance metrics of the couriers (e.g., on time percentage, number of packages lost or damaged, current delivery load, etc.). Couriers 112 can indicate an availability to deliver items in certain regions and the logistics management system 108 can identify candidate couriers to deliver the item 102 based at least partly on couriers 112 that have indicated an availability to deliver items in locations corresponding to the location of the sender 104 and the location of the recipient 106. In various implementations, the couriers 112 can utilize a number of modes of transportation to deliver the item 102 from the sender 104 to the recipient 106. In the illustrative example of FIG. 1, the courier 112(2) can transport an item utilizing a vehicle 114.

After the logistics management system 108 has identified one or more candidate couriers to transport an item between electronic locker arrangements, the logistics management system 108 can send communications to the candidate couriers indicating the item to be delivered and the electronic locker arrangements to be utilized to drop off and pick up the item. In the illustrative example of FIG. 1, the logistics management system 108 can identify the couriers 112(1) and 112(2) as candidates to transport the item 102 from the first electronic locker arrangement 110(1) to the second electronic locker arrangement 110(2). Candidate couriers can send an indication to the logistics management system 108 to accept the job of transporting an item between electronic locker arrangements and the logistics management system 108 can assign a particular courier to transport the item.

Access to the electronic locker arrangements 110 can be controlled to provide secure delivery of the item 102 to the recipient 106. In some implementations, one or more authentication techniques can be utilized to control access to lockers of the electronic locker arrangements 110 by the recipient 106 and/or courier 112. For example, a QR code can be provided to the recipient 106 before picking up the item 102 at an electronic locker arrangement 110. The QR code can uniquely identify the recipient 106 with respect to the item 102. In particular implementations, the logistics management system 108 can generate the QR code in response to a request from the recipient 106 to access the item stored by the electronic locker arrangement 110. The electronic locker arrangement 110 can provide the QR code to a computing device of the recipient 106 and the computing device of the recipient 106 can extract certain information from the QR code. The extracted information can be sent back to the logistics management system 108 along with an identifier of the recipient 106. The logistics management system 108 can then utilize the identifier of the recipient 106 and the information extracted from the QR code to authorize access to the electronic locker arrangement 110 by the recipient 106. In response to verification of the identity of the recipient 106, in various implementations, the logistics management system 108 can cause the electronic locker arrangement 110 to open the particular locker storing the item 102 by sending a signal to the electronic locker arrangement 110 to open the particular locker. Consequently, the recipient 106 can pick up the item 102 from the electronic locker arrangement 110.

In additional implementations, an additional QR code can be provided to a courier 112 that is assigned to deliver the item 102 to the recipient from the sender 104 via an electronic locker arrangement 110. The additional QR code can uniquely identify the courier 112 with respect to the item 102. That is, the additional QR code provided to the courier 112 with respect to the item can be different from the QR code provided to the recipient 106 with respect to the item. Also, the QR codes provided to the recipient 106 and the courier 112 with respect to the item 102 can be different from QR codes provided to an additional recipient and an additional courier with respect to a different item that is to be delivered via the logistics management system 108. Thus, the QR codes generated by the logistics management system 108 are dynamic and not static and the same QR code is not re-used to gain access to the electronic locker arrangements 110. The dynamic generation of QR codes by the logistics management system 108 provides an authentication technique to access the electronic locker arrangements 110 that is more secure than the techniques utilized to authenticate identities in conventional item delivery arrangements.

In particular implementations, the logistics management system 108 can generate the additional QR code in response to a request from the courier 112 to access the item stored by the electronic locker arrangement 110. The electronic locker arrangement 110 can provide the additional QR code to a computing device of the courier 112 and the computing device of the courier 112 can extract certain information from the additional QR code. The extracted information can be sent back to the logistics management system 108 along with an identifier of the courier 112. The logistics management system 108 can then utilize the identifier of the courier 112 and the information extracted from the additional QR code to authorize access to the electronic locker arrangement 110 by the courier 112. In response to verification of the identity of the courier 112 by the logistics management system 108, the courier 112 can be granted access to a particular locker of the electronic locker arrangement 110 that is storing the item 102. For example, the logistics management system 108 can send a signal to the electronic locker arrangement 108 to open the locker storing the item 102. The courier 112 can then obtain the item 102 from the locker and transport the item 102 to another locker in a different electronic locker arrangement 110 that is proximate to a location of the recipient 106.

Other techniques can also be utilized to control access to the electronic locker arrangements 110. In some implementations, access to the electronic locker arrangements 110 can be controlled by providing an identifier of the item 102. For example, the logistics management system 108 can generate a bar code for the item 102 in response to a request from the sender 104 to deliver the item 102 to the recipient 106. The sender 104 can activate a scanner on an electronic locker arrangement 110 to scan the bar code of the item 102 and the electronic locker arrangement 110 can communicate with the logistics management system 108 to obtain access to a locker of the electronic locker arrangement 110 to store the item 102. In this way, the sender 104 can store the item 102 in an electronic locker arrangement 110 until the item 102 is picked up by a courier 112 for delivery to the recipient 106 or until the item 102 is picked up by the recipient 106. In particular implementations, a courier 112 can also utilize a bar code of the item 102 to obtain access to an additional electronic locker arrangement 110 to drop off the item 102 until the recipient 106 picks up the item 102.

Figure 2:
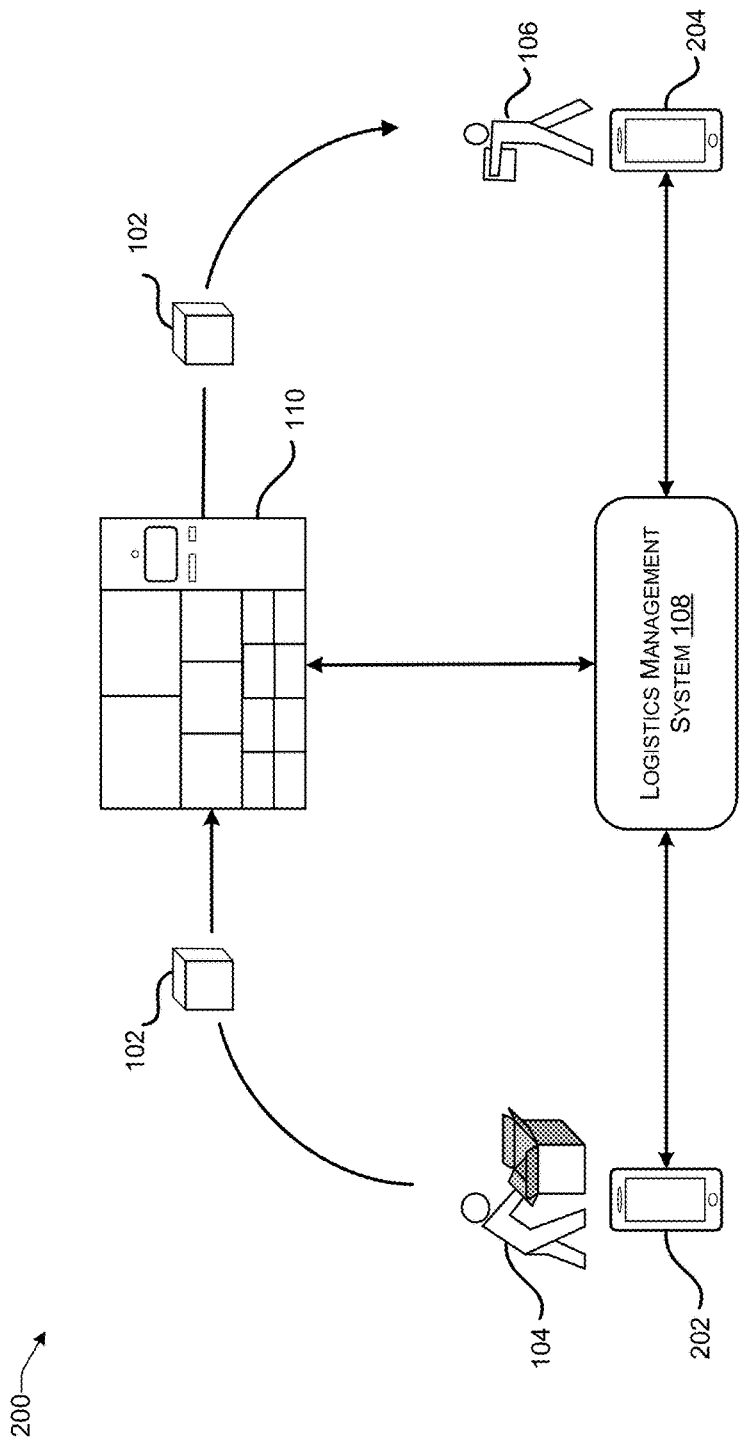
FIG. 2 is a diagram of an architecture to facilitate the delivery of an item from a sender to a recipient by a logistics management system using a single electronic locker arrangement according to some implementations.

FIG. 2 is a diagram of an architecture 200 to facilitate the delivery of an item 102 from a sender 104 to a recipient 106 by a logistics management system 108 using a single electronic locker 110 arrangement according to some implementations. The architecture 200 also includes a first computing device 202 that is operated by the sender 104 and a second computing device 204 that is operated by the recipient 106. The computing devices 202, 204 can include one or more of a smart phone, laptop computing device, tablet computing device, electronic reader device, portable gaming device, desktop computing device, or gaming console.

In some implementations, the sender 104 can utilize the first computing device 202 to send a request to the logistics management system 108 to deliver the item 102 to the recipient 106. In particular implementations, the first computing device 202 can execute a logistics application to send the request to deliver the item 102 to the recipient 106. In various examples, the logistics application can be a mobile app executing on a portable computing device and the logistics application can be provided by a service provider associated with the logistics management system 108. The logistics application executed by the first computing device 202 can provide one or more user interfaces that include user interface elements to enter information related to a request to deliver the item 102 to the recipient 106. For example, the logistics application can capture information entered by the sender 104 corresponding to the item 102 (e.g., dimensions of the item 102, weight of the item 102, images of the item 102, description of the item 102, etc.), information related to the recipient 106 (e.g., location of the recipient 106, identifier(s) of the recipient 106, etc.), and/or information related to the sender 104 (e.g. location of the sender 104, payment information of the sender, identifier(s) of the sender 104, etc.).

In response to receiving the request from the sender 104 to deliver the item 102 to the recipient 106, the logistics management system 108 can determine that the item 102 is to be delivered to the recipient 106 via the electronic locker arrangement 110. In particular implementations, the logistics management system 108 can determine that the electronic locker arrangement 110 corresponds to the location of both the sender 104 and the recipient 106. In this way, the logistics management system 108 can determine that the sender 104 can drop off the item 102 at the electronic locker arrangement 110 and the recipient 106 can pick up the item 102 from the electronic locker arrangement 110. In illustrative implementations, the sender 104 and the recipient 106 can be located in a same zip code.

In some implementations, the logistics management system 108 can utilize information obtained from the sender 104 about the item 102 to determine a particular locker within the electronic locker arrangement 110 to store the item 102. For example, the logistics management system 108 can identify a locker of the electronic locker arrangement 110 to store the item 102 based at least partly on dimensions of the item 102 and/or weight of the item 102. That is, the lockers of the electronic locker arrangement 110 can have different dimensions and weight capacities. In these situations, the logistics management system 108 can determine one or more lockers of the electronic locker arrangement 110 that have dimensions and/or weight capacities that correspond to the dimensions and/or weight capacities of the item 102. The logistics management system 108 can also determine a locker to store the item 102 based on a number of lockers that are not already occupied or are not already scheduled to be occupied during the time in which the item 102 is requested to be stored in the electronic locker arrangement 110.

The logistics management system 108 can generate an identifier of the item 102 and provide the identifier to the sender 104 via the application executing on the first computing device 202. In some cases, the identifier of the item 202 can include a bar code. The identifier of the item 102 can be utilized to provide access to the locker of the electronic locker arrangement 110 that is dedicated to store the item 102. In some implementations, the sender 104 can utilize the logistics application executing on the first computing device 202 to provide the identifier of the item 102 to the electronic locker arrangement 110. For example, the logistics application executing on the first computing device 202 can generate a user interface displaying the identifier of the item 102 and the electronic locker arrangement 110 can include an input device to capture the identifier. In an illustrative example, the electronic locker arrangement 110 can include a barcode scanner and the first computing device 202 can display a barcode identifying the item. The barcode scanner of the electronic locker arrangement 110 can scan the barcode being displayed on the first computing device 202. In other implementations, the sender 104 can print the bar code and provide a physical copy of the bar code to be scanned by the electronic locker arrangement 110.

In some implementations, the electronic locker arrangement 110 can send the identifier of the item 102 to the logistics management system 108. The logistics management system 108 can then verify that the electronic locker arrangement 110 corresponds to the particular electronic locker arrangement assigned to the item 102 by the logistics management system 108 based on the identifier of the item 102. In particular implementations, the logistics management system 108 can include and/or be in communication with a database storing information that indicates identifiers of items and the lockers of the electronic locker arrangements that are assigned to store the respective items. In response to receiving the identifier of the item 102 from the electronic locker arrangement 110, the logistics management system 108 can parse the database to determine that the item 102 is assigned to be stored by a locker of the electronic locker arrangement 110. Based on verifying that the item 102 is to be stored by the electronic locker arrangement 110, the logistics management system 108 can send information to the electronic locker arrangement 110 indicating that the sender 104 is authorized to store the item 102. In some situations, the information can include a signal to open a particular locker of the electronic locker arrangement 110 that is assigned to store the item 102.

In additional implementations, the electronic locker arrangement 110 can make the determination that the item 102 is to be stored in the electronic locker arrangement 110 without communicating with the logistics management system 108. In these implementations, the electronic locker arrangement 110 can store information that can be utilized to verify that the item 102 is to be stored by the electronic locker arrangement 110. In response to obtaining an identifier of the item 102, the electronic locker arrangement 110 can access data stored in memory of the electronic locker arrangement 110 to determine that the identifier of the item 102 is included in a list of items that are assigned to be stored by the electronic locker arrangement 110. Based on determining that the item 102 is to be stored by the electronic locker arrangement 110, the electronic locker arrangement 110 can cause a particular locker assigned to store the item 102 to open.

The electronic locker arrangement 110 can determine that the sender 104 has placed the item 102 into a locker for storage. In some implementations, the electronic locker arrangement 110 can determine that the item 102 has been stored in the electronic storage arrangement 110 based on input from one or more sensors of the electronic locker arrangement 110. For example, the electronic locker arrangement 110 can determine that a locker assigned to store the item 102 has been closed. In another example, the electronic locker arrangement 110 can obtain video input to determine that the item 102 has been stored inside a locker of the electronic locker arrangement 110. In additional examples, the electronic locker arrangement 110 can utilize data from weight sensors to determine that the item 102 has been placed in a locker of the electronic locker arrangement 110. The electronic locker arrangement 110 can also obtain input, such as via a user interface displayed by the electronic locker arrangement 110 or via a logistics application executed by the first computing device 202, indicating that the item 102 has been stored in a locker of the electronic locker arrangement 110. In additional implementations, the electronic locker arrangement 110 can send sensor data to the logistics management system 108 and the logistics management system 108 can determine that the item 102 has been stored in the electronic locker arrangement 110.

Based on determining that the item 102 is stored in the electronic locker arrangement 110, the logistics management system 108 can send a notification to the second computing device 202 of the recipient 106 indicating that the item 102 is available to be picked up by the recipient 106. In some cases, the notification can indicate a location of the electronic locker arrangement 110. The notification can also include information indicating the sender 104. In various implementations, the notification can be received and processed by a logistics application executed by the second computing device 204. The logistics application can be provided by a service provider associated with the logistics management system 108, in some cases. In some implementations, the logistics application executed by the second computing device 204 can be another instance of the logistics application being executed by the first computing device 202.

The recipient 106 can request to access the locker of the electronic locker arrangement 110 that is storing the item 102. Based on receiving the request to access the locker storing the item 102, the electronic locker arrangement 110 can send a request to the logistics management system 108 for identity verification information. In some implementations, the identity verification information can include a QR code. In particular implementations, based on receiving the request from the electronic locker arrangement 110 for identity verification information, the logistics management system 108 can generate the identity verification information and provide the identity verification information to the electronic locker arrangement 110. In illustrative examples, the logistics management system 108 can generate a QR code that uniquely identifies the recipient 106 in relation to the item 102 and send the QR code to the electronic locker arrangement 110. The electronic locker arrangement 110 can then provide the QR code to the recipient 106. For example, the electronic locker arrangement 110 can display the QR code and the recipient 106 can utilize the second computing device 202 to scan the QR code. The second computing device 202 can then extract an identifier encoded by the QR code and send the identifier to the logistics management system 108. In some cases, the identifier can be an identifier of the electronic locker arrangement 110. The logistics application executing on the second computing device 204 can also provide additional information to the logistics management system 108, such as an identifier of the recipient 106 that is stored on the second computing device 204 in association with the logistics application. In this way, the logistics management system 108 can verify the identity of the recipient 106 based on the first identifier extracted from the QR code that was obtained by the second computing device 204 from the electronic locker arrangement 110 and the second identifier of the recipient 106.

In response to verifying the identity of the recipient 106, the logistics management system 108 can cause the electronic locker arrangement 110 to provide access to a locker storing the item 102 by the recipient 106. In some implementations, the logistics management system 108 can send a signal to the electronic locker arrangement 110 to open the locker storing the item 102. The electronic locker arrangement 110 can determine that the item 102 has been removed from the locker based at least partly on sensor data obtained by the electronic locker arrangement 110. In some cases, the sensor data can include video, images, weight sensors, magnetic sensors, combinations thereof, and the like. In various implementations, the electronic locker arrangement 110 can send the sensor data to the logistics management system 108 and the logistics management system 108 can determine that the item 102 has been removed from the locker of the electronic locker arrangement 110. In other implementations, the electronic locker arrangement 110 can send information to the logistics management system 108 indicating that the locker of the electronic locker arrangement 110 has been closed.

After determining that the locker previously storing the item 102 has been closed, the logistics management system 108 can determine that the item 102 has been delivered to the recipient 106. In particular implementations, the logistics management system 108 can also determine that the item 102 has been delivered to the recipient 106 based at least partly on information received via the logistics application executed by the second computing device 204. For example, the logistics application can provide one or more user interfaces that can capture input from the recipient 106 indicating that the item 102 has been delivered to the recipient 106. The logistics management system 108 can then update a database associated with the logistics management system 108 to indicate that the item 102 has been delivered to the recipient 106. The electronic locker arrangement 110 can also determine that the item has been obtained by the recipient 106 based on input obtained by the electronic locker arrangement 110 from the recipient 106. In particular, the electronic locker arrangement 110 can display one or more user interfaces that obtain input indicating that the item 102 has been picked up by the recipient 106. In other cases, a logistics application executed by the second computing device 204 can provide one or more user interfaces to obtain input indicating that the item 102 has been picked up by the recipient 106.

Figure 3:
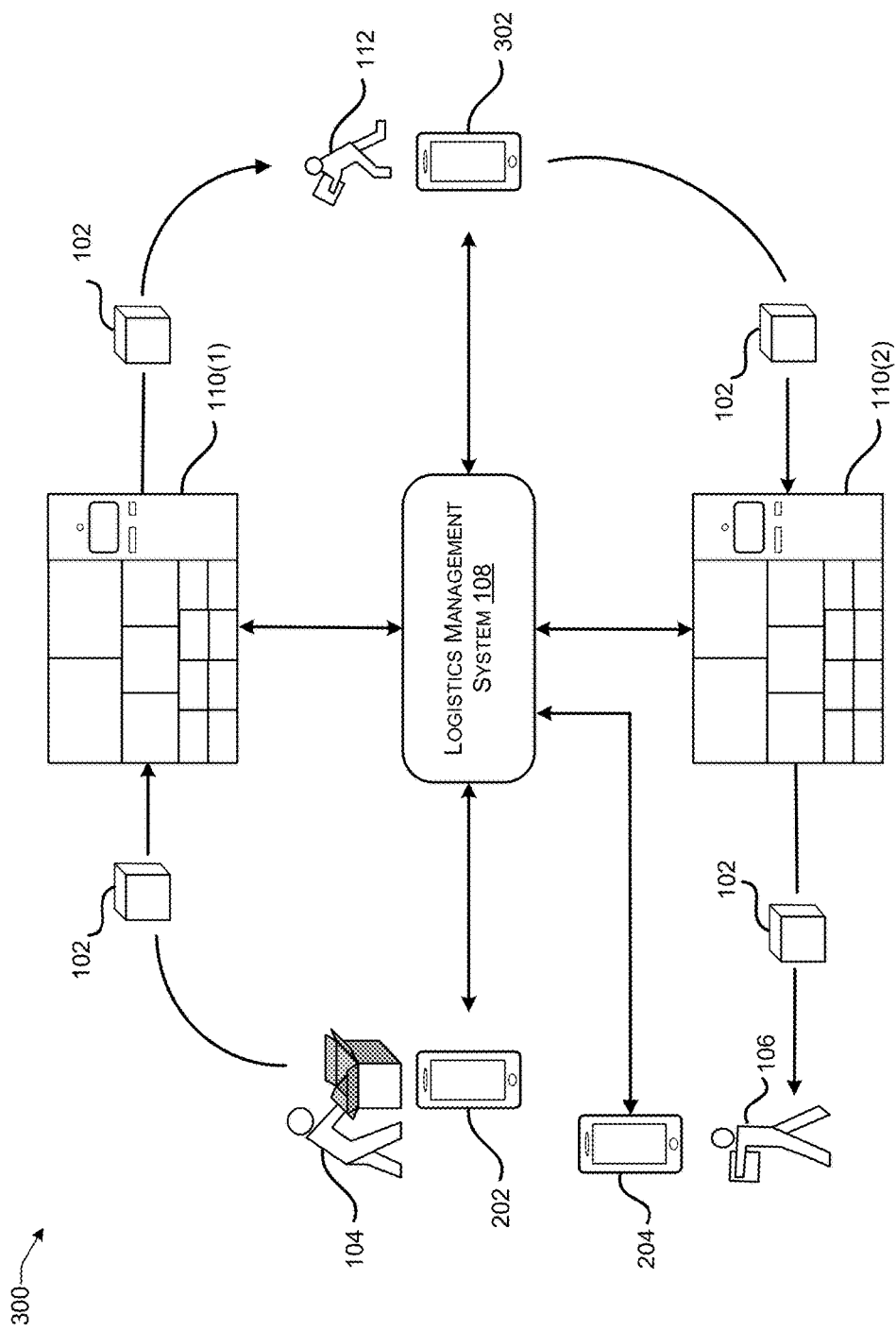
FIG. 3 is a diagram of an architecture to facilitate delivery of an item from a sender to a recipient by a logistics management system using multiple electronic locker arrangements according to some implementations.

FIG. 3 is a diagram of an architecture 300 to facilitate delivery of an item 102 from a sender 104 to a recipient 106 by a logistics management system 108 using multiple electronic locker arrangements according to some implementations. In the illustrative example of FIG. 3, the architecture 300 includes a first electronic locker arrangement 110(1) and a second electronic locker arrangement 110(2). The item 102 can be transported from the first electronic locker arrangement 110(1) to the second electronic locker arrangement 110(2) by a courier 112. The courier 112 can have a third computing device 302 that is executing an instance of a logistics application. The first computing device 202 of the sender 104 and the second computing device 204 of the recipient 106 can also be executing respective instances of the logistics application.

In an illustrative example, the sender 104 can utilize the first computing device 202 to send a request to the logistics management system 108 to deliver the item 102 to the recipient 106. In particular implementations, the logistics application executed by the first computing device 202 can provide one or more user interfaces that include user interface elements to enter information related to a request to deliver the item 102 to the recipient 106. For example, the logistics application can capture information entered by the sender 104 corresponding to the item 102 (e.g., dimensions of the item 102, weight of the item 102, images of the item 102, description of the item 102, etc.), information related to the recipient 106 (e.g., location of the recipient 106, identifier(s) of the recipient 106, etc.), and/or information related to the sender 104 (e.g. location of the sender 104, payment information of the sender, identifier(s) of the sender 104, etc.).

In response to receiving the request from the sender 104 to deliver the item 102 to the recipient 106, the logistics management system 108 can determine that the item 102 is to be delivered to the recipient 106 via multiple electronic locker arrangements. In some implementations, the logistics management system 108 can identify the electronic locker arrangements 110 to be utilized to deliver the item 102 to the recipient 106 based at least partly on a location of the sender 104 and the recipient 106. In an illustrative example, the logistics management system 108 can determine that the sender 104 is located in a first location and the that recipient is located in a second location. In particular implementations, the first location can be a first zip code and the second location can be a second zip code. In these situations, the logistics management system 108 can identify electronic locker arrangements 110 that are located in the first location and the second location. In an illustrative example, the logistics management system 108 can determine that the first electronic locker arrangement 110(1) is located in the first location of the sender 104 and that the second electronic locker arrangement 110(2) is located in the second location of the recipient 106. In this way, the logistics management system 108 can determine that the sender 104 can drop off the item 102 at the first electronic locker arrangement 110(1) and the recipient 106 can pick up the item 102 from the second electronic locker arrangement 110(2).

The logistics management system 108 can also determine a courier 112 to transport the item 102 from the first electronic locker arrangement 110(1) to the second electronic locker arrangement 110(2). The logistics management system 108 can identify the courier 112 from among a number of candidate couriers. The candidate couriers can be determined by the logistics management system 108 based at least partly on a location of the candidate couriers. In some cases, the logistics management system 108 can determine one or more candidate couriers to transport the item 102 from the first electronic locker arrangement 110(1) to the second electronic locker arrangement 110(2) based on a proximity of the candidate couriers to the location of the first electronic locker arrangement 110(1) and the location of the second electronic locker arrangement 110(2). In particular implementations, the logistics management system 108 can determine couriers within a specified distance of the location of the first electronic locker arrangement 110(1) and/or the location of the second electronic locker arrangement 110(2) and identify those couriers as candidate couriers to transport the item 102 from the first electronic locker arrangement 110(1) and the second electronic locker arrangement 110(2). In illustrative implementations, the logistics management system 108 can identify couriers within a same zip code as the first electronic locker arrangement 110(1) as candidate couriers to transport the item 102 from the first electronic locker arrangement 110(1) and the second electronic locker arrangement 110(2). In additional implementations, the logistics management system 108 can identify candidate couriers based on information provided by couriers indicating that the couriers are available to deliver items to be picked up in the location of the first electronic locker arrangement 110(1) and dropped off in the location of the second electronic locker arrangement 110(2).

The logistics management system 108 can send a notification to the candidate couriers that the item 102 is available to be transported from the first electronic locker arrangement 110(1) to the second electronic locker arrangement 110(2). In some cases, the notification can be provided via a logistics application executed by computing devices of the candidate couriers. The logistics management system 108 can obtain responses to the notification and identify the courier 112 to transport the item 102 from the first electronic locker arrangement 110(1) to the second electronic locker arrangement 110(2).

In some implementations, the logistics management system 108 can utilize information obtained from the sender 104 about the item 102 to determine particular lockers within the first electronic locker arrangement 110(1) and the second electronic locker arrangement 110(2) that can be utilized to store the item 102. For example, the logistics management system 108 can identify lockers of the first electronic locker arrangement 110(1) and the second electronic locker arrangement 110(2) to store the item 102 based at least partly on dimensions of the item 102 and/or weight of the item 102. That is, the lockers of the electronic locker arrangements 110(1), 110(2) can have different dimensions and weight capacities. In these situations, the logistics management system 108 can determine one or more lockers of the electronic locker arrangements 110(1), 110(2) that have dimensions and/or weight capacities that correspond to the dimensions and/or weight capacities of the item 102. The logistics management system 108 can also determine a locker to store the item 102 based on a number of lockers of the electronic locker arrangements 110(1), 110(2) that are not already occupied or are not already scheduled to be occupied during the time in which the item 102 is requested to be stored in the first electronic locker arrangement 110(1) and the second electronic locker arrangement 110(2).

The logistics management system 108 can generate an identifier of the item 102 and provide the identifier to the sender 104 via the application executing on the first computing device 202. In some cases, the identifier of the item 202 can include a bar code. The identifier of the item 102 can be utilized to provide access to the locker of the first electronic locker arrangement 110(1) that is dedicated to store the item 102. In some implementations, the sender 104 can utilize the logistics application executing on the first computing device 202 to provide the identifier of the item 102 to the first electronic locker arrangement 110(1). For example, the logistics application executing on the first computing device 202 can generate a user interface displaying the identifier of the item 102 and the first electronic locker arrangement 110(1) can include an input device to capture the identifier. In an illustrative example, the first electronic locker arrangement 110(1) can include a barcode scanner and the first computing device 202 can display a barcode identifying the item. The barcode scanner of the first electronic locker arrangement 110(1) can scan the barcode being displayed on the first computing device 202.

In some implementations, the first electronic locker arrangement 110(1) can send the identifier of the item 102 to the logistics management system 108. The logistics management system 108 can then verify that the first electronic locker arrangement 110(1) corresponds to the particular electronic locker arrangement assigned to store the item 102 by the logistics management system 108 based on the identifier of the item 102. In particular implementations, the logistics management system 108 can include and/or be in communication with a database storing information that indicates identifiers of items and the electronic locker arrangements that are assigned to store the respective items. In response to receiving the identifier of the item 102 from the first electronic locker arrangement 110(1), the logistics management system 108 can parse the database to determine that the item 102 is assigned to be stored by the first electronic locker arrangement 110(1). Based on verifying that the item 102 is to be stored by the first electronic locker arrangement 110(1), the logistics management system 108 can send information to the first electronic locker arrangement 110(1) indicating that the item 102 can be stored by the first electronic locker arrangement 110(1). In some situations, the information can include a signal to open a particular locker of the first electronic locker arrangement 110(1) that is assigned to store the item 102.

In additional implementations, the first electronic locker arrangement 110(1) can make the determination that the item 102 is to be stored in the first electronic locker arrangement 110(1) without communicating with the logistics management system 108. In these implementations, the first electronic locker arrangement 110(1) can store information that can be utilized to verify that the item 102 is to be stored by the first electronic locker arrangement 110(1). In response to obtaining an identifier of the item 102 (e.g., bar code), the first electronic locker arrangement 110(1) can access data stored in memory of the first electronic locker arrangement 110(1) to determine that the identifier of the item 102 is included in a list of items that are assigned to be stored by the first electronic locker arrangement 110(1).

Based on determining that the item 102 is to be stored by the first electronic locker arrangement 110(1), the first electronic locker arrangement 110(1) can cause a particular locker to open.

The first electronic locker arrangement 110(1) can determine that the sender 104 has placed the item 102 into a locker for storage. In some implementations, the first electronic locker arrangement 110(1) can determine that the item 102 has been stored in the first electronic storage arrangement 110(1) based on input from one or more sensors of the first electronic locker arrangement 110(1). For example, the first electronic locker arrangement 110(1) can determine that a locker assigned to store the item 102 has been closed. In another example, the first electronic locker arrangement 110(1) can obtain video input to determine that the item 102 has been stored inside a locker of the first electronic locker arrangement 110(1). In additional examples, the first electronic locker arrangement 110(1) can utilize data from weight sensors to determine that the item 102 has been placed in a locker of the first electronic locker arrangement 110(1). In additional implementations, the first electronic locker arrangement 110(1) can send sensor data to the logistics management system 108 and the logistics management system 108 can determine that the item 102 has been stored in the first electronic locker arrangement 110(1). In various implementations, the first electronic locker arrangement 110(1) or a logistics application executed by the first computing device 202 can display one or more user interfaces to obtain input from the sender 104 indicating that the item 102 has been stored in a locker of the first electronic locker arrangement 110(1).

Based on determining that the item 102 is stored in the first electronic locker arrangement 110(1), the logistics management system 108 can send a notification to the courier 112 indicating that the item 102 is available to be picked up by the courier 112. In some cases, the notification can indicate a location of the first electronic locker arrangement 110(1). The notification can also include information indicating the sender 104 and/or the recipient 106. The notification can be sent to the third computing device 302. In various implementations, the notification can be received and processed by a logistics application executed by the third computing device 302.

The courier 112 can request to access the locker of the first electronic locker arrangement 110(1) that is storing the item 102. Based on receiving the request to access the locker storing the item 102, the first electronic locker arrangement 110(1) can send a request to the logistics management system 108 for identity verification information. In some implementations, the identity verification information can include a QR code. In particular implementations, based on receiving the request from the first electronic locker arrangement 110(1) for identity verification information, the logistics management system 108 can generate the identity verification information and provide the identity verification information to the first electronic locker arrangement 110(1). In illustrative examples, the logistics management system 108 can generate a QR code that uniquely identifies the courier 112 in relation to the item 102 and send the QR code to the first electronic locker arrangement 110(1). The first electronic locker arrangement 110(1) can then provide the QR code to the courier 112. For example, the first electronic locker arrangement 110(1) can display the QR code and the courier 112 can utilize the third computing device 302 to scan the QR code. The third computing device 302 can then extract an identifier encoded by the QR code and send the identifier to the logistics management system 108. In some cases, the identifier extracted from the QR code can include an identifier of the first electronic locker arrangement 110(1). The logistics application executing on the third computing device 302 can also provide additional information to the logistics management system 108, such as an identifier of the courier 112 that is stored on the third computing device 302 in association with the logistics application. In this way, the logistics management system 108 can verify the identity of the courier 112 based on the first identifier extracted from the QR code that was obtained by the third computing device 302 from the first electronic locker arrangement 110(1) and the second identifier of the courier 112.

In response to verifying the identity of the courier 112, the logistics management system 108 can cause the first electronic locker arrangement 110(1) to provide access to a locker storing the item 102 by the courier 112. In some implementations, the logistics management system 108 can send a signal to the first electronic locker arrangement 110(1) to open the locker storing the item 102. The first electronic locker arrangement 110(1) can determine that the item 102 has been removed from the locker based at least partly on sensor data obtained by the first electronic locker arrangement 110(1). In some cases, the sensor data can include video, images, weight sensors, magnetic sensors, combinations thereof, and the like. In various implementations, the first electronic locker arrangement 110(1) can send the sensor data to the logistics management system 108 and the logistics management system 108 can determine that the item 102 has been removed from the locker of the first electronic locker arrangement 110(1). In other implementations, the first electronic locker arrangement 110(1) can send information to the logistics management system 108 indicating that the locker of the first electronic locker arrangement 110(1) has been closed. In various implementations, the first electronic locker arrangement 110(1) or a logistics application executed by the third computing device 302 can display one or more user interfaces to obtain input from the courier 112 indicating that the item 102 has been removed from a locker of the first electronic locker arrangement 110(1).

After determining that the locker previously storing the item 102 has been closed, the logistics management system 108 can determine that the item 102 is in the possession of the courier 112. The logistics management system 108 can update a status of the item 102 to indicate that the item 102 is in transport from the first electronic locker arrangement 110(1) to the second electronic locker arrangement 110(2). The courier 112 can move to the location of the second electronic locker arrangement 110(2) to drop off the item 102 for pick up by the recipient 106. The courier 112 can provide an identifier of the item 102, an identifier of the courier 112, or both to obtain access to a locker of the second electronic locker arrangement 110(2). In particular implementations, the courier 112 can operate the third computing device 302 to display an identifier of the item 102 via the logistics application executed by the third computing device 302. In illustrative implementations, the third computing device 302 can display the bar code of the item 102. A bar code scanner of the second electronic locker arrangement 110(2) can scan the bar code.

The second electronic locker arrangement 110(2) or the logistics management system 108 can determine that the identifier (e.g., bar code) obtained via the third computing device 302 corresponds to the item and also identify the locker of the second electronic locker arrangement 110(2) that is assigned to store the item 102 for pickup by the recipient 106. In various implementations, the second electronic locker arrangement 110(2) can obtain an identifier from the third computing device 302 and send the identifier to the logistics management system 108. The logistics management system 108 can access data stored in a database to verify that the item 102 is to be stored by the second electronic locker arrangement 110(2) and to identify a locker of the second electronic locker arrangement 110(2) that is to store the item 102. In these scenarios, the logistics management system 108 can send information to the second electronic locker arrangement 110(2) to open the locker to store the item 102.

The second electronic locker arrangement 110(2) can obtain sensor data related to the placement of the item 102 in a locker of the second electronic locker arrangement 110(2). The second electronic locker arrangement 110(2) or the logistics management system 108 can determine, based at least partly on the sensor data, that the item 102 has been stored in the second electronic locker arrangement 110(2). The second electronic locker arrangement 110(2) or the logistics management system 108 can also determine that the item 102 has been stored in the second electronic locker arrangement 110(2) based at least partly on input provided by the courier 112 at the second electronic locker arrangement 112(2) or via a logistics application executed by the third computing device 302 indicating that the item has been stores in the second electronic locker arrangement 110(2). After determining that the item 102 has been stored in the second electronic locker arrangement 110(2), the logistics management system 108 can send a notification to the recipient 106 that the item 102 is available for pickup. In some cases, the notification can indicate a location of the electronic locker arrangement 110. The notification can also include information indicating the sender 104. The notification can be sent to the second computing device 204. In various implementations, the notification can be received and processed by a logistics application executed by the second computing device 204. The logistics application can be provided by a service provider associated with the logistics management system 108, in some cases. In some implementations, the logistics application executed by the second computing device 204 can be another instance of the logistics application being executed by the first computing device 202.

The recipient 106 can request to access the locker of the second electronic locker arrangement 110(2) that is storing the item 102. Based on receiving the request to access the locker storing the item 102, the second electronic locker arrangement 110(2) can send a request to the logistics management system 108 for identity verification information. In some implementations, the identity verification information can include a QR code. In particular implementations, based on receiving the request from the second electronic locker arrangement 110(2) for identity verification information, the logistics management system 108 can generate the identity verification information and provide the identity verification information to the second electronic locker arrangement 110(2). In illustrative examples, the logistics management system 108 can generate a QR code that uniquely identifies the recipient 106 in relation to the item 102 and send the QR code to the second electronic locker arrangement 110(2). The QR code provided to the recipient 106 via the second electronic locker arrangement 110(2) is different from the QR code provided to the courier 112 via the first electronic locker arrangement 110(1). The second electronic locker arrangement 110(2) can then provide the QR code to the recipient 106. For example, the second electronic locker arrangement 110(2) can display the QR code and the recipient 106 can utilize the second computing device 202 to scan the QR code. The second computing device 202 can then extract an identifier encoded by the QR code and send the identifier to the logistics management system 108. In some cases, the identifier extracted from the QR code can include an identifier of the second electronic locker arrangement 110(2). The logistics application executing on the second computing device 204 can also provide additional information to the logistics management system 108, such as an identifier of the recipient 106 that is stored on the second computing device 204 in association with the logistics application. In this way, the logistics management system 108 can verify the identity of the recipient 106 based on the first identifier extracted from the QR code that was obtained by the second computing device 204 from the second electronic locker arrangement 110(2) and the second identifier of the recipient 106.

In response to verifying the identity of the recipient 106, the logistics management system 108 can cause the second electronic locker arrangement 110(2) to provide access to a locker storing the item 102 by the recipient 106. In some implementations, the logistics management system 108 can send a signal to the second electronic locker arrangement 110(2) to open the locker storing the item 102. The second electronic locker arrangement 110(2) can determine that the item 102 has been removed from the locker based at least partly on sensor data obtained by the second electronic locker arrangement 110(2). In some cases, the sensor data can include video, images, weight sensors, magnetic sensors, combinations thereof, and the like. In various implementations, the second electronic locker arrangement 110(2) can send the sensor data to the logistics management system 108 and the logistics management system 108 can determine that the item 102 has been removed from the locker of the second electronic locker arrangement 110(2). In other implementations, the second electronic locker arrangement 110(2) can send information to the logistics management system 108 indicating that the locker of the second electronic locker arrangement 110(2) has been closed.

After determining that the locker previously storing the item 102 has been closed, the logistics management system 108 can determine that the item 102 has been delivered to the recipient 106. In particular implementations, the logistics management system 108 can also determine that the item 102 has been delivered to the recipient 106 based at least partly on information received via the logistics application executed by the second computing device 204. For example, the logistics application can provide one or more user interfaces that can capture input from the recipient 106 indicating that the item 102 has been delivered to the recipient 106. In other examples, the second electronic locker arrangement 110(2) or a logistics application executed by the second computing device 204 can display one or more user interfaces to obtain input from the recipient 106 indicating that the item 102 has been removed from a locker of the second electronic locker arrangement 110(2). The logistics management system 108 can then update a database associated with the logistics management system 108 to indicate that the item 102 has been delivered to the recipient 106.

Figure 4:
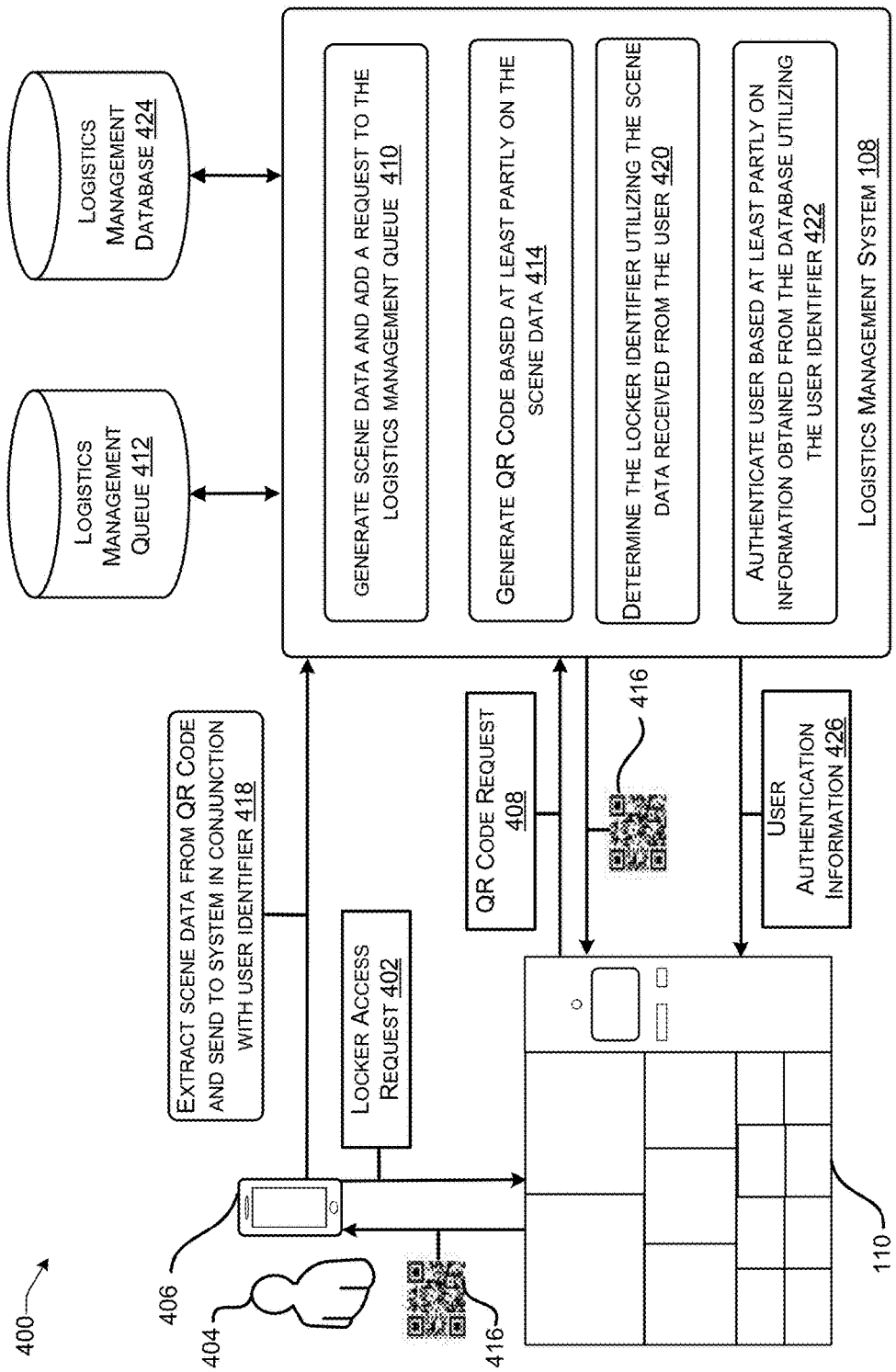
FIG. 4 is a diagram of an architecture to provide secure access to an electronic locker arrangement for the delivery of an item from a sender to a recipient according to some implementations.

FIG. 4 is a diagram of an architecture 400 to provide secure access to an electronic locker arrangement 110 for the delivery of an item from a sender to a recipient according to some implementations. In particular, the electronic locker arrangement 110 can receive a locker access request 402 from a user 404 via a computing device 406 of the user 404.

In other implementations, the locker access request 402 can be obtained via one or more user interfaces displayed by the electronic locker arrangement 110. The user 404 can be any individual attempting to gain access to a locker of the electronic locker arrangement 110 to obtain an item being stored by the electronic locker arrangement 110. In some illustrative examples, the user 404 can include a courier requesting access to obtain an item that is to be delivered from the electronic locker arrangement 110 to an additional electronic locker arrangement. In other illustrative examples, the user 404 can include a recipient that is requesting to pick up an item that is being delivered to the recipient from a sender of the item. In various implementations, the locker access request 402 can include an identifier of the item that the user 404 is attempting to obtain from the electronic locker arrangement 110. In certain implementations, the locker access request 402 can include an identifier of the user 404.

Based at least partly on receiving the locker access request 402, the electronic locker arrangement 110 can send a QR code request 408 to the logistics management system 108. At 410, the logistics management system 108 can generate scene data in response to receiving the QR code request 408 and add a request to the logistics management queue 412. In particular implementations, the logistics management queue 412 can include requests for QR codes that have been provided by one or more electronic locker arrangements that are communicatively coupled to the logistics management system 108. Additionally, the scene data can include at least one of a time stamp corresponding to a time that the locker access request 402 was received or an identifier of the electronic locker arrangement 110. In particular implementations, the scene data can include a location of the electronic locker arrangement 110. The scene data can also include an identifier of a locker storing the item. At 414, the logistics management system 108 can generate a QR code 416 based at least partly on the scene data. By utilizing the scene data to generate the QR code 416, the logistics management system 108 can generate a QR code 416 that uniquely identifies the user 404 with respect to an item that the user 404 is attempting to obtain from the electronic locker arrangement 110. The QR code 416 can, in certain implementations, encode information included in the scene data.

The logistics management system 108 can send the QR code 416 to the electronic locker arrangement 110. The electronic locker arrangement 110 can display the QR code 416 via a display device of the electronic locker arrangement 110. The user 404 can utilize the computing device 406 to scan the QR code 416. In some cases, the QR code 416 can be scanned using a logistics application executed by the computing device 406. The computing device 406 can extract at least a portion of the scene data that is encoded by the QR code 416. In certain examples, the computing device 406 can extract an identifier of the locker storing the item from the QR code 416. Additionally, the computing device 406 can determine a user identifier corresponding to the user 404. In some cases, the logistics application executed by the computing device 406 can determine the user identifier based on information provided by the user 404 during registration of the logistics application. In various implementations, the user identifier can be associated with an account of the user 404 with the logistics management system 108. The computing device 406 can provide the information extracted from the scene data and the user identifier to the logistics management system 108.

At 420, the logistics management system 108 can utilize the portion of the scene data extracted from the QR code 416, such as an identifier of the locker storing the item and provided by the computing device 406 to verify an identity of the user 404. The logistics management system 108 can, at 422, utilize the user identifier and the identifier of the electronic locker arrangement 110 to parse information stored in a logistics management database 424. In particular implementations, the logistics management system 108 can access information stored by the logistics management database 424 to determine that the user 404 is authorized to obtain access to an item stored by the electronic locker arrangement 110. In some examples, the logistics management system 108 can access the logistics management database 424 to determine that the user 404 is a courier that has been selected to deliver the item to a recipient and that the courier has been authorized to pick up the item from the electronic locker arrangement 110. In other examples, the logistics management system 108 can access the logistics management database to determine that the user 404 is a recipient that is authorized to access the electronic locker arrangement 110 to obtain an item that has been sent to the recipient. In response to determining that the user 404 is authorized to access an item stored by the electronic locker arrangement 110, the logistics management system 108 can send user authentication information 426 to the electronic locker arrangement 110. The user authentication information 426 can indicate that the electronic locker arrangement 110 can open a locker storing an item that corresponds to the user 404.

Figure 5:
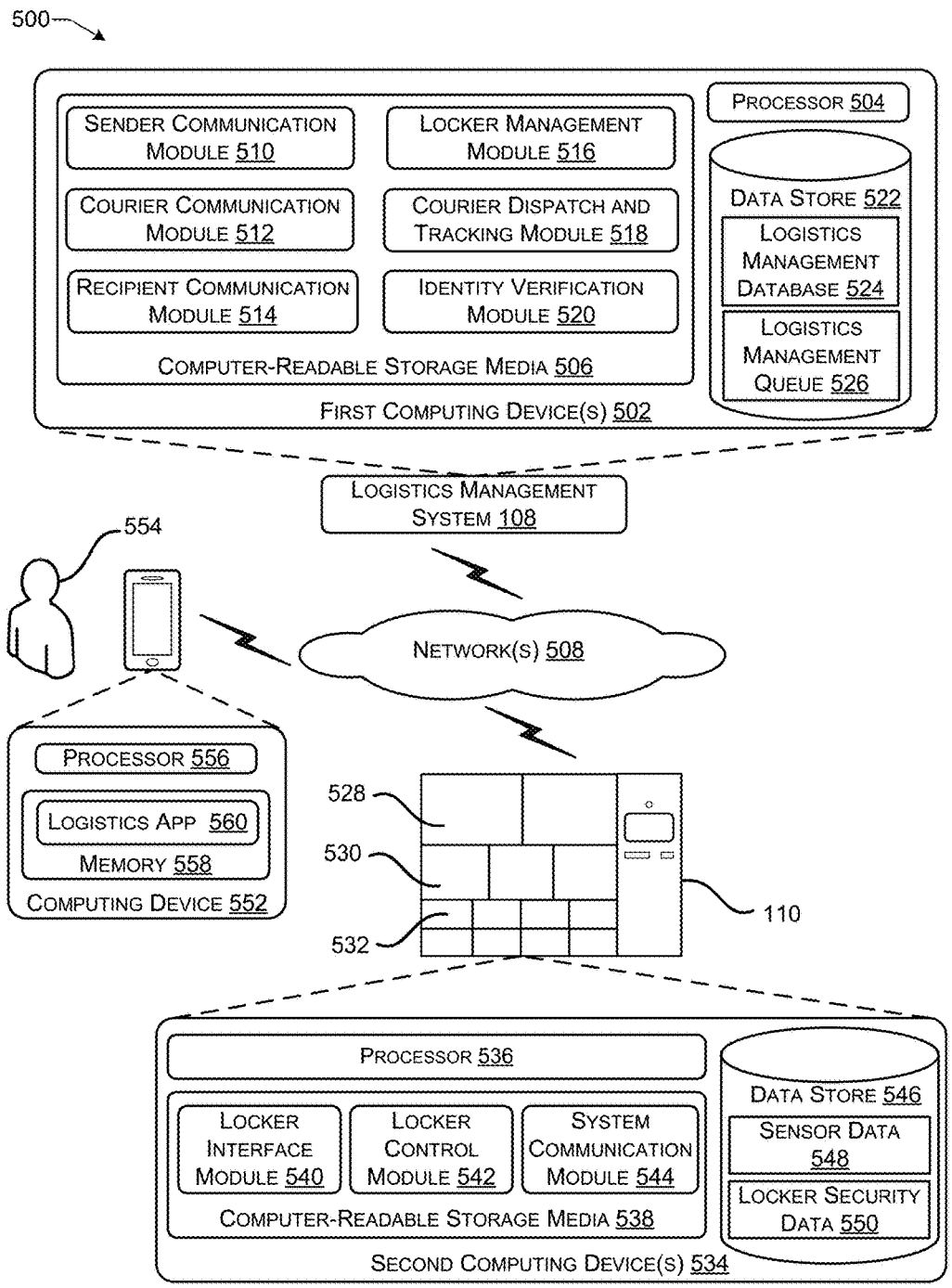
FIG. 5 is a diagram of a system including an electronic locker arrangement, a logistics management system, and a logistics mobile application to facilitate the delivery of an item from a sender to a recipient according to some implementations.

FIG. 5 is a diagram of a system 500 including an electronic locker arrangement 110, a logistics management system 108, and a logistics mobile application to facilitate the delivery of an item from a sender to a recipient according to some implementations. The system 500 may include one or more first computing devices 502. The one or more first computing devices 502 can be associated with the logistics management system 108. In some implementations, the one or more first computing devices 502 can be included in a cloud computing architecture that operates the one or more first computing devices 502 on behalf of a service provider implementing the logistics management system 108. In these scenarios, the cloud computing architecture can implement one or more virtual machine instances on behalf of the service provider associated with the logistics management system 108 on the one or more first computing devices 502. The cloud computing architecture can be located remote from a service provider associated with the logistics management system 108. In additional implementations, the one or more first computing devices 502 can be under the direct control of the service provider associated with the logistics management system 108. For example, the service provider associated with the logistics management system 108 can maintain the one or more first computing devices 502 to perform operations related to coordinating and managing the delivery of items from senders to recipients. In various implementations, the one or more first computing devices 502 can include one or more server computers.

The one or more first computing devices 502 can include one or more processors, such as processor 504. The one or more processors 504 can include at least one hardware processor, such as a microprocessor. In some cases, the one or more processors 504 can include a central processing unit (CPU), a graphics processing unit (GPU), or both a CPU and GPU, or other processing units. Additionally, the one or more processors 504 can include a local memory that may store program modules, program data, and/or one or more operating systems.

In addition, the one or more first computing devices 502 can include one or more computer-readable storage media, such as computer-readable storage media 506. The computer-readable storage media 506 can include volatile and nonvolatile memory and/or removable and non-removable media implemented in any type of technology for storage of information, such as computer-readable instructions, data structures, program modules, or other data. Such computer-readable storage media 506 can include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the one or more first computing devices 502, the computer-readable storage media 506 can be a type of tangible computer-readable storage media and can be a non-transitory storage media.

The one or more first computing devices 502 can include one or network interfaces (not shown) to communicate with other computing devices via one or more networks 508. The one or more networks 508 can include one or more of the Internet, a cable network, a satellite network, a wide area wireless communication network, a wired local area network, a wireless local area network, or a public switched telephone network (PSTN).

The computer-readable storage media 506 can be used to store any number of functional components that are executable by the one or more processors 504. In many implementations, these functional components comprise instructions or programs that are executable by the one or more processors 504 and that, when executed, implement operational logic for performing the operations attributed to the one or more first computing devices 502. Functional components of the one or more first computing devices 502 that can be executed on the one or more processors 504 for implementing the various functions and features related to coordinating and managing the delivery of items utilizing electronic locker arrangements, as described herein, include a sender communication module 510, a courier communication module 512, a recipient communication module 514, a locker management module 516, a courier dispatch and tracking module 518, and an identity verification module 520.

Additionally, the one or more first computing devices 502 can include one or more input/output devices (not shown). The one or more input/output devices can include a display device, keyboard, a remote controller, a mouse, a printer, audio input/output devices, a speaker, a microphone, a camera, and so forth The one or more first computing devices 502 can also include, or be coupled to, a data store 522 that can include, but is not limited to, RAM, ROM, EEPROM, flash memory, one or more hard disks, solid state drives, optical memory (e.g. CD, DVD), or other non-transient memory technologies. The data store 522 can maintain information that is utilized by the one or more first computing devices 502 to perform operations related to coordinating and managing the delivery of items utilizing electronic locker arrangements.

For example, the data store 522 can store a logistics management database 524 and a logistics management queue 526.

The logistics management database 524 can include information indicating transactions related to the delivery of items from senders to recipients. For each request by a sender to have an item delivered to a recipient using the logistics management system 108, the logistics management database 524 can generate a set of data stored in a data structure, such as a database table, one or more rows of a database table, and/or a record, dedicated to storing information associated with coordinating and managing the delivery of the item from the sender to the recipient. For example, the logistics management database 524 can store information about the sender and the recipient. To illustrate, the logistics management database 524 can store names of the sender and recipient, locations of the sender and recipient, payment information for the sender and/or the recipient, delivery preferences of the sender and/or recipient, combinations thereof, and the like. The locations of the sender and recipient can include an address, a zip code, an Internet Protocol (IP) address, a real-time location, or combinations thereof. A real-time location of the sender and the recipient can include Geographic Positioning System (GPS) information, location information obtained from a mobile communications service provider (e.g., triangulation data), or both. In situations where the sender and/or the recipient have an account with the logistics management system 108, the logistics management database 524 can include respective login identifiers, passwords, and the like to enable the sender and/or recipient to access their account with the logistics management system 108.

The logistics management database 524 can also store information about items being delivered from recipients to senders. For example, the logistics management database 524 can store information indicating the weight of an item to be delivered, dimensions of an item to be delivered, a category or type of the item to be delivered (e.g., electronic device, baby products, household goods, etc.), images of the item to be delivered, a description of the item to be delivered, notes regarding the item to be delivered (e.g., fragile, irregular shape, perishable, etc.), combinations thereof, and so forth. Additionally, the logistics management database 524 can store information indicating timing related to the delivery of the item, such as a time that the item was dropped off by a sender at an electronic locker arrangement, a time that the item was picked up by a courier at an electronic locker arrangement, a time that the item was dropped off by a courier at an electronic locker arrangement, a time that a recipient picked up the item from an electronic locker arrangement, or combinations thereof. The logistics management database 524 can also store information indicating a time that the item is to be made available for pickup by a recipient and/or a time that the item is to be made available for pickup by a courier. In some cases, the logistics management database 524 can indicate a window of time that the item is to be available for pickup by a recipient or a courier. In other instances, the logistics management database 524 can indicate a threshold time (e.g., deadline) that the item is to be delivered to an electronic locker arrangement and available for pickup by a recipient or courier. In various implementations, the logistics management database 524 can store a status of items being delivered. The status of the items can indicate that the items have been dropped off by a sender or a courier, that the items are available for pick up by a courier or a recipient, that the items are in transport from one electronic locker arrangement to another electronic locker arrangement, or combinations thereof.

Further, the logistics management database 524 can include information related to individual couriers that are assigned to transport items between one or more electronic locker arrangements. To illustrate, the logistics management database 524 can include information indicating identifiers of couriers, delivery history of couriers, ratings of couriers, locations associated with couriers, combinations thereof, and the like. The delivery history of couriers can indicate a number of items delivered by individual couriers, types of items delivered by individual couriers, electronic locker arrangements accessed by individual couriers, times that items were delivered by individual couriers, or combinations thereof. The ratings of the couriers can be obtained from senders and/or recipients of items that were delivered by the individual couriers. In some cases, the ratings of the couriers can be obtained by the logistics management system 108 analyzing data related to metrics associated with delivery of items by couriers, such as on-time delivery by the couriers, time to transport items between electronic locker arrangements, errors made in the delivery of items, number of lost or damaged items, combinations thereof, and so forth. Additionally, the location information stored by the logistics management database 524 in conjunction with the delivery of items can indicate a real-time location of the couriers, locations indicated in profiles of the couriers, locations of electronic locker arrangements where the couriers have picked up and dropped off items, or combinations thereof. In certain implementations, the logistics management database 524 can indicate a status of couriers. The status of the couriers can indicate that the couriers are accepting items for delivery. In other situations, the status of the couriers can indicate that the couriers are not accepting items for delivery. In particular implementations, the status of the couriers can also indicate locations where the couriers are accepting items for delivery. The logistics management database 524 can also include a queue of items that are to be delivered by individual couriers.

The logistics management database 524 can also store information about electronic locker arrangements associated with the logistics management system 108. In some situations, the logistics management database 524 can store information indicating lockers of the electronic locker arrangements that are occupied with an item. The logistics management database 524 can also store information indicating lockers of the electronic locker arrangements that are scheduled to store items for drop off or pick up. Additionally, the logistics management database 524 can store information indicating dimensions of the lockers included in the electronic locker arrangements and/or weight capacities of the lockers of the electronic locker arrangements. In the illustrative example of FIG. 5, the representative electronic locker arrangement 110 can include a first locker 528 having first dimensions and/or a first weight capacity, a second locker 530 having second dimensions and/or a second weight capacity, and a third locker 532 having third dimensions and/or a third weight capacity. The first locker 528 can have larger dimensions and/or a higher weight capacity than both the second locker 530 and the third locker 532. The second locker 530 can have larger dimensions and/or a higher weight capacity than the third locker 532. In certain situations, at least one of the lockers 528, 530, 532 can be refrigerated or heated. The logistics management database 524 can also store information indicating that doors of the lockers of the individual electronic locker arrangements are open or closed.

In an illustrative implementation, the logistics management database 524 can include at least one data structure for individual requests to deliver an item from a sender to a recipient. The at least one data structure for an individual request to deliver an item can at least in part include an identifier of a sender, an identifier of a recipient, a location of a sender, a location of a recipient, dimensions of the item, category of the item, description of the item, images of the item, characteristics of the item (e.g., perishable, irregular shape), combinations thereof, and the like. Additionally, the at least one data structure for an individual request to deliver an item can at least in part include an identifier of a courier assigned to deliver the item, an identifier of at least one electronic locker arrangement assigned to store the item, an identifier of at least one particular locker assigned to store the item, or combinations thereof. Further, the at least one data structure for an individual request to deliver an item can include a location of a courier delivering the item, a location of the item, a status of at least one locker assigned to store the item (e.g., occupied, empty, door open, door closed), or combinations thereof. The at least one data structure for an individual request to deliver an item can also include one or more identifiers related to the item, such as one or more bar codes assigned to the item. In other implementations, the at least one data structure for an individual request to deliver an item can include authentication information to obtain access to at least one locker storing the item, such as a QR code provided in association with granting access to the at least one locker storing the item. In certain implementations, the at least one data structure for an individual request to deliver an item can include timing information related to the delivery of an item, such as drop off times, pick up times, delivery deadlines, time that the request to deliver the item was made or received, time that requests for authentication information were made or received, combinations thereof, and so forth.

The logistics management queue 526 can include requests that are awaiting processing by the one or more first computing devices 502. In particular implementations, the logistics management queue 526 can include requests to obtain QR codes that are received from electronic locker arrangements. The logistics management queue 526 can store the requests sequentially as they are received and provide the requests to the corresponding modules 510, 512, 514, 516, 518, 520 based at least partly on the order in which the requests were received. In certain implementations, the logistics management queue 526 can provide the requests for processing by the modules 510, 512, 514, 516, 518, 520 based on a priority associated with the requests.

The sender communications module 510 can include computer-readable instructions that when executed by the processor 504 send, receive, process, and store information corresponding to communications associated with a sender of an item to a recipient. In some implementations, the sender communication module 510 can obtain a request from a sender for an item to be delivered to a recipient. The request can indicate information about the sender, information about the item to be delivered, and information about the recipient. In particular implementations, the sender communication module 510 can provide a website to obtain requests from senders to deliver items to recipients. In additional implementations, the sender communications module 510 can be in communication with a mobile application executed by a computing device of a sender to obtain a request to deliver an item to a recipient. The sender communication module 510 can also provide information related to the delivery of the item to a computing device of the sender. For example, the sender communication module 510 can provide a notification that the item has been picked up by a courier or delivered to an electronic locker arrangement by a courier. The sender communication module 510 can also provide a notification that the recipient has picked up the item. Further, the sender communication module 510 can obtain payment information from the sender of the item.

The courier communication module 512 can include computer-readable instructions that when executed by the processor 504 send, receive, process, and store information corresponding to communications associated with a courier transporting an item between electronic locker arrangements. The courier communication module 512 can provide communications indicating that an item is available for delivery to a recipient. In some cases, the communications can include information about the item, a location of a first electronic locker arrangement storing the item, and a location of a second electronic locker arrangement where the item is to be delivered. The communications can also include an amount of payment for delivery of the item and/or a time by which the item is to be delivered. The courier communication module 512 can also obtain communications from couriers indicating a request to deliver an item and notifications that the couriers have been selected to deliver one or more items that are available to be delivered. In various implementations, the courier communication module 512 can obtain information indicating a status of couriers and/or information indicating locations where the couriers are available to deliver items. In particular implementations, the courier communications module 512 can obtain and provide communications related to couriers via a website. In additional implementations, the courier communication module 512 can be in communication with a mobile app executed by computing devices of couriers to obtain information from couriers and to provide information to couriers.

The recipient communication module 514 can include computer-readable instructions that when executed by the processor 504 send, receive, process, and store information corresponding to communications associated with a recipient of an item delivered via the logistics management system 108. The recipient communication module 514 can provide notifications to recipients that items are available to be picked up by the recipients. The notifications can include locations of locker arrangements that are storing items to be picked up the recipients. The notifications can also include information about the sender of the item. In some cases, the recipient communication module 514 can provide updates indicating a location of an item as it is being transported to an electronic locker arrangement for delivery to a recipient. Additionally, the recipient communication module 514 can obtain information from recipients that the recipients have obtained the items that are intended to be delivered to the recipients. In some implementations, the recipient communication module 514 can obtain and provide communications related to the delivery of items to recipients via a website. In additional implementations, the recipient communication module 514 can be in communication with a mobile app executed by computing devices of recipients to obtain information from recipients and to provide information to recipients.

In particular implementations, the sender communication module 510, the courier communication module 512, and the recipient communication module 514 can utilize a Short Messaging Service (SMS) gateway to communicate with senders, couriers, and recipients regarding items to be delivered to recipient from senders. The sender communication module 510, the courier communication module 512, and the recipient communication module 514 can also utilize an application programming interface (API) to facilitate communications between the one or more first computing devices 502 and computing devices of the senders, recipients, and couriers. In illustrative implementations, the API can include a representational state transfer (RESTful) API to facilitate communications between the one or more first computing devices 502 and computing devices of the senders, recipients, and the couriers. In particular, the API includes a number of calls that enable information to be exchanged between a platform of the one or more first computing devices 502 and various platforms of the computing devices of the senders, recipients, and the couriers that can be different from the platform of the one or more first computing devices 502. In some cases, the different platforms utilized by the one or more first computing devices 502 and the computing devices of the senders, recipients, and the couriers can correspond to different operating systems, different communication protocols, and/or different resource types (e.g., extensible markup language (XML) resources, hypertext markup language (HTML) resources, java script object notation (JSON) resources).

The locker management module 516 can include computer-readable instructions that when executed by the processor 504 coordinate the assignment of lockers at electronic locker arrangements to facilitate the delivery of items via the electronic locker arrangements. The locker management module 516 can be in communication with the sender communication module 510 or the logistics management database 524 to determine that a request has been received to deliver an item from a sender to a recipient. The locker management module 516 can utilize information included in the request to identify one or more electronic locker arrangements to store the item being delivered. The locker management module 516 can also determine specific lockers within an electronic locker arrangement to store the item.

In particular implementations, the locker management module 516 can determine a location of a sender of an item and determine a location of a recipient of the item. The locker management module 516 can also determine one or more electronic locker arrangements that correspond to the location of the sender and the location of the recipient. In an illustrative example, the locker management module 516 can determine a zip code of the sender and a zip code of the recipient. Continuing with this example, the locker management module 516 can determine one or more electronic locker arrangements that correspond to the zip code of the sender and the zip code of the recipient. In situations where the sender and the recipient are located in the same zip code, the locker management module 516 can identify a single electronic locker arrangement to utilize to deliver the item where the single electronic locker arrangement is located in the zip code of the sender and recipient. In scenarios where the sender and the recipient are located in different zip codes, the locker management module 516 can determine a first electronic locker arrangement located in the zip code of the sender to drop off the item and a second electronic locker arrangement in the zip code of the recipient for the recipient to pick up the item. In some implementations, the locker management module 516 can determine one or more intermediate electronic locker arrangements located between a first electronic locker arrangement located in a location of the sender and a second electronic locker arrangement located in a location of the recipient.

In additional implementations, the locker management module 516 can determine one or more electronic locker arrangements that are within a threshold distance of the location of the sender and the location of the recipient. In these situations, there can be multiple electronic locker arrangements disposed in a single zip code or there can be a single electronic locker arrangement that services multiple zip codes. In illustrative implementations, the locker management module 516 can identify one or more electronic locker arrangements that are within a threshold distance of a location of the sender to determine an electronic locker arrangement for the sender to drop off the item. The locker management module 516 can also identify one or more electronic locker arrangements that are within a threshold distance of a location of the recipient to determine an electronic locker arrangement for the recipient to pick up the item. In certain implementations, the threshold distance can include a radius or one or more other dimensions that define an area serviced by each electronic locker arrangement. The locker management module 516 can identify a first electronic locker arrangement to drop off the item based at least partly on determining that the sender of the item is located within an area serviced by the first electronic locker arrangement. The locker management module 516 can also identify a second locker arrangement for the recipient to pick up the item based at least partly on determining that the recipient of the item is located within an area serviced by the second electronic locker arrangement. In situations where a sender and/or recipient are located within service areas of multiple electronic locker arrangements, the locker management module 516 can determine the electronic locker arrangement that is within a shortest distance from the location of the sender and/or recipient to utilize for drop off and/or pick up of the item.

In various implementations, the locker management module 516 can determine one or more locker arrangements to store the item based at least partly on input obtained from the sender. In some cases, the locker management module 516 can obtain first input from the sender indicating a first electronic locker arrangement to store the item and second input from the sender indicating a second electronic locker arrangement to store the item. In particular implementations, the locker management module 516 can obtain the input indicating one or more electronic locker arrangements to store the item via a mobile app executed by a computing device of the sender or via a website of a service provider associated with the logistics management system 108. In certain implementations, the locker management module 516 can obtain information from an electronic locker arrangement indicating one or more electronic locker arrangements to store the item. For example, an electronic locker arrangement can provide one or more user interfaces to capture input indicating one or more electronic locker arrangements to store the item and provide the input to the locker management module 516. In an illustrative example, the locker management module 516 can obtain input from an individual specifying one or more electronic locker arrangements to store an item based at least partly on the sender and/or the recipient being located in a location that does not include an electronic locker arrangement. To illustrate, in situations where a sender and/or recipient is located in a zip code that does not include an electronic locker arrangement, input can be provided by an individual indicating an electronic locker arrangement where an item is to be dropped off or picked up. In some scenarios, the locker management module 516 can provide a suggestion indicating an electronic locker arrangement that is nearest the sender and/or recipient to store an item.

Further, the locker management module 516 can identify specific lockers within the one or more electronic locker arrangements that are to be utilized to deliver an item to a recipient. For example, the locker management module 516 can identify one or more lockers included in the one or more electronic locker arrangements that are available to store the item. The locker management module 516 can determine criteria, such as dimensions and/or a weight, of an item to be stored by an electronic locker arrangement and identify one or more lockers that satisfy the criteria of the item. To illustrate, the locker management module 516 can determine one or more lockers that the item can fit within by comparing dimensions of the item with dimensions of lockers of electronic locker arrangements. Based at least partly on the dimension and/or weight criteria and the availability of lockers, the locker management module 516 can assign at least one locker to store an item. In some cases, the locker management module 516 can assign a first locker to store the item until the item is picked up by a courier and a second locker to store the item until the item is picked up by the recipient. In other situations, the locker management module 516 can assign a single locker to store the item until the item is picked up by the recipient. The locker management module 516 can cause information to be stored in the logistics management database 524 indicating the one or more lockers assigned to store an item.

In particular situations, the locker management module 516 can process requests for delivery of multiple items to the same recipient. In these scenarios, the locker management module 516 can determine that the items can be stored in a single locker at one or more electronic locker arrangements or at multiple lockers of one or more electronic locker arrangements. The number of lockers assigned to store multiple items for a single recipient can be based at least partly on dimensions of the items with respect to dimensions of lockers and/or availability of lockers to store the items. In certain implementations, the items to be delivered to a recipient can be stored in a first number of lockers at a first electronic locker arrangement and a second number of lockers, different from the first number, at a second electronic locker arrangement.

In various implementations, the locker management module 516 can provide information to electronic locker arrangements that can be utilized to control access to the lockers of the electronic locker arrangements. In particular implementations, the locker management module 516 can provide signals to open and/or close particular lockers of an electronic locker arrangement. In some situations, the locker management module 516 can cause the electronic locker arrangements to display user interfaces and to obtain input from the electronic locker arrangements via the user interfaces. For example, the locker management module 516 can cause an electronic locker arrangement to display user interfaces related to obtaining a request by a sender to have an item delivered to a recipient. In other examples, the locker management module 516 can cause an electronic locker arrangement to display user interfaces related to providing and/or obtaining bar codes associated with an item. In additional examples, the locker management module 516 can cause an electronic locker arrangement to display user interfaces related to providing and/or obtaining user identity authentication information, such as QR codes or biometric information, in association with users obtaining access to lockers of the electronic locker arrangement to pick up an item stored by the electronic locker arrangement.

The locker management module 516 can dynamically and in real-time manage and coordinate assignments of items to lockers of electronic locker arrangements. In particular implementations, the locker management module 516 can process hundreds, up to thousands of requests at a time for items to be stored in lockers of electronic locker arrangements that are in communication with the logistics management system. In some implementations, the electronic locker arrangements in communication with the logistics management system 108 can be owned and/or managed by different entities. For example, some electronic locker arrangements in communication with the logistics management system 108 can be owned or operated by a service provider different from the service provider associated with the logistics management system 108, but these electronic locker arrangements can still be utilized by the logistics management system to deliver items.

In order to process large numbers of requests to store items in lockers, the locker management module 516 analyzes data obtained from the electronic locker arrangements (e.g., locker door open/close status, weight sensors, video/image data, dimensions and/or weight capacities of lockers) and information included in requests to deliver items via the electronic locker arrangements (e.g., dimensions of items, weight of items, time constraints on delivery, type of item) to determine lockers that are available to store items. In various implementations, the locker management module 516 can also analyze location information for items while the items are in transit and estimate delivery times to determine the availability of lockers in electronic locker arrangements to store items. In this way, the locker management module 516 can perform a complicated analysis of data, some of which can be changing dynamically (e.g., real-time location data), to determine the availability of lockers to store items and to assign lockers to store items for delivery via electronic locker arrangements.

The courier dispatch and tracking module 518 can include computer-readable instructions that when executed by the processor 504 to identify couriers and assign the couriers to deliver items via electronic locker arrangements. The courier dispatch and tracking module 518 can obtain information from the sender communication module 510 or the logistics management database 524 indicating a request to store an item for delivery to a recipient and determine, based on the information associated with the request, the location of the sender and the recipient. In some implementations, the courier dispatch and tracking module 518 can obtain information from the locker management module 516 indicating a location of one or more electronic locker arrangements that have been assigned to store the item. The courier dispatch and tracking module 518 can also obtain courier location information indicating locations corresponding to couriers. In some situations, the courier location information can be obtained from the logistics management database. In particular implementations, the courier location information can include GPS data indicating a location of the couriers. The GPS data can, in some cases, indicate a real-time or near real-time location of the couriers. In various implementations, the courier location information can be included in profiles of couriers stored in the logistics management database 524. The profiles of the couriers can indicate geographic locations for which the respective couriers can be available to deliver items. In additional implementations, the courier location information can be obtained from mobile computing devices of the couriers. In certain implementations, the courier profiles can be modified by the couriers to indicate availability to deliver items associated with different locations at different time. For example, a courier profile can indicate that the courier is available to deliver items associated with a first location and a second location at a first time and that the courier is available to deliver items associated with a third location and a fourth location at a second time, where at least one of the third location and the fourth location are different from at least one of the first location and the second location.

The courier dispatch and tracking module 518 can compare one or more locations where the item is to be stored with locations associated with a number of couriers. The courier dispatch and tracking module 518 can identify one or more couriers associated with locations that overlap with the one or more locations where the item is to be stored. For example, the courier dispatch and tracking module 518 can determine that an item is to be stored in a particular zip code and the courier dispatch and tracking module 518 can identify one or more couriers that are associated with the same zip code. To illustrate, the courier dispatch and tracking module 518 can determine that the one or more couriers are currently located in the particular zip code based at least partly on GPS data corresponding to the one or more couriers and/or that the one or more couriers have expressed availability to deliver items in their respective profiles to deliver items in the particular zip code. In some implementations, the current location of couriers can be weighed more heavily in identifying couriers to deliver an item than locations included in profiles of the couriers.

In addition to location, the courier dispatch and tracking module 518 can also utilize one or more additional criteria to identify couriers to deliver items. In some examples, the courier dispatch and tracking module 518 can determine a number of items that couriers are already assigned to deliver in order to determine the availability of couriers to deliver items. For example, the more items that a courier is currently assigned to deliver, the less likely the courier dispatch and tracking module 518 is to select the courier for delivery of an additional item. Additionally, courier dispatch and tracking module 518 can determine ratings of couriers to identify one or more couriers to deliver an item. The ratings of the couriers can be based at least partly on performance of the couriers with respect to previous deliveries. Further, the courier dispatch and tracking module 518 can analyze previous experience with delivering certain types of items to identify one or more couriers to deliver an item. To illustrate, for certain items that may be associated with particular restrictions, such as fragile items, irregularly shaped items, perishable items, and the like, the courier dispatch and tracking module 518 can give preference to couriers that have previously delivered similar items in determining one or more couriers to deliver an item of a similar type.

By analyzing a number of criteria with respect to a group of couriers, the courier dispatch and tracking module 518 can identify a subset of the group of couriers that are candidates to deliver the item. In various implementations, the courier dispatch and tracking module 518 can determine a score for couriers included in a group of couriers based on one or more criteria and select a subset of the group of couriers having at least a threshold score. In additional implementations, the courier dispatch and tracking module 518 can identify couriers satisfying one or more criteria to identify couriers that are candidates to deliver an item. In an illustrative example, the courier dispatch and tracking module 518 can identify couriers associated with and/or located in a particular location, such as a particular zip code, to determine candidate couriers to deliver an item. Thus, the courier dispatch and tracking module 518 can filter a group of couriers based on one or more criteria to identify one or more candidate couriers to deliver an item.

After identifying one or more candidate couriers to deliver an item, the courier dispatch and tracking module 518 can invoke the courier communication module 512 to send notifications to the candidate couriers indicating that the item is available for delivery. The courier dispatch and tracking module 518 can receive responses from the candidate couriers where the responses indicate an availability to deliver the item. In some implementations, the responses can be obtained by the courier communication module 512. The courier dispatch and tracking module 518 can then select a courier from among the couriers providing responses to assign to deliver the item. In some implementations, the courier dispatch and tracking module 518 can additionally filter couriers after receiving responses to a notification to deliver an item. In some illustrative examples, the courier dispatch and tracking module 518 can filter the couriers providing responses to the notification based at least partly on times in which the responses were received. In a particular illustrative example, the courier dispatch and tracking module 518 can assign the first courier to provide a response to the notification to deliver the item. In other illustrative examples, the courier dispatch and tracking module 518 can filter the couriers providing responses to the notification based on other criteria, such as location of the couriers with respect to locations of electronic locker arrangements used to store the item, ratings of the couriers responding to the notification, number of items assigned to the respective couriers for delivery, delivery history of the couriers, combinations thereof, and the like. In certain implementations, the courier dispatch and tracking module 518 can identify a number of items to be picked up from or dropped off at a particular electronic locker arrangement. In these situations, the courier dispatch and tracking module 518 can assign a courier to deliver multiple items that are associated with different senders and/or recipients, but are being picked up from and/or dropped off at a particular electronic locker arrangement. In various implementations, the courier dispatch and tracking module 518 can perform a first filtering operation to identify candidate couriers to notify about delivery of an item and a second filtering operation to determine a particular courier to assign to deliver the item.

In response to determining a courier to deliver an item, the courier dispatch and tracking module 518 can invoke the courier communication module 512 to send a notification to the courier indicating that the courier has been assigned to deliver the item. In some implementations, the courier dispatch and tracking module 518 can cause a record or other data structure stored in the logistics management database 524 to indicate that the courier has been assigned to deliver the item. In particular implementations, the courier dispatch and tracking module 518 can track the location of the courier assigned to deliver the item to determine the progress in the delivery of the item. The courier dispatch and tracking module 518 can determine an estimate of the delivery time of the item based at least partly on the location of the courier assigned to deliver the item. Additionally, the courier dispatch and tracking module 518 can operate in conjunction with the sender communication module 510 and/or the recipient communication module 514 to provide updates on the delivery of the item based at least partly on the location of the courier assigned to deliver the item.

The identity verification module 520 can include computer-readable instructions that when executed by the processor 504 to verify the identity of individuals attempting to access an item stored by an electronic locker arrangement. In some cases, the identity verification module 520 can verify the identity of a sender of an item. In other situations, the identity verification module 520 can verify the identity of a courier delivering the item. In additional implementations, the identity verification module 520 can verify the identity of a recipient of the item. The identity verification module 520 can verify the identity of individuals based at least partly on identifiers of the individuals. The identity verification module 520 can also verify the identity of individuals based at least partly on video data, image data, or biometric data of the individuals. Additionally, the identity verification module 520 can verify the identity of individuals based at least partly on identifiers generated by the logistics management system 520, such as bar codes and/or QR codes. In some implementations, the identity verification module 520 can utilize different types of data to verify the identity of different individuals. For example, the identity verification module 520 can verify the identity of a first individual based at least partly on a first type of data and the identity verification module 520 can verify the identity of a second individual based at least partly on a second type of data that is different from the first type of data.

In particular implementations, the identity verification module 520 can verify the identity of a sender of an item attempting to access a locker of an electronic locker arrangement to drop off the item for delivery. In these situations, the identity verification module 520 can verify the identity of the sender based at least partly on an identifier of the sender associated with the logistics management system 108. For example, the sender can provide one or more identifiers, such as a user name and password, via an electronic locker arrangement. The identity verification module 520 can then access information stored in the logistics management database 524 to verify that the identification information provided by the sender corresponds to information stored in the logistics management database 524. The identity verification module 520 can also generate a bar code that is associated with the sender and the item being delivered. The identity verification module 520 can obtain bar code information provided by a sender from an electronic locker arrangement and analyze the bar code with respect to bar codes stored in the logistics management database 524. The identity verification module 520 can determine that the bar code information provided by the sender corresponds to a bar code associated with an item that is to be stored in the electronic locker arrangement and delivered on behalf of the sender.

The identity verification module 520 can also verify the identity of a courier delivering an item on behalf of a sender. In some implementations, the identity verification module 520 can verify the identity of the courier at a first electronic locker arrangement where the courier picks up the item and also verify the identity of the courier at a second electronic locker arrangement where the courier drops off the item for the recipient. In certain implementations, the identity verification module 520 can utilize different techniques to verify the identity of the courier at different electronic locker arrangements. For example, the identity verification module 520 can utilize a first identity verification technique to verify the identity of the courier at an electronic locker arrangement where the courier is picking up the item and a second identity verification technique to verify the identity of the courier at an additional electronic locker arrangement where the courier is dropping off the item.

In particular implementations, the identity verification module 520 can generate a QR code that can be utilized by the courier to access a locker storing an item that has been dropped off by a sender of the item. In some cases, the identity verification module 520 can obtain a request indicating that the sender is attempting to access the locker storing the item. In various implementations, the request can be provided by the electronic locker arrangement storing the item. In other scenarios, the request can be provided via an application executed by a computing device of the courier. The identity verification module 520 can generate a QR code that uniquely identifies the courier with respect to the item. For example, the identity verification module 520 can obtain a time related to the item and generate the QR code based at least partly on the time. The time related to the item can include a time that the item was stored in the electronic locker arrangement or a time that the courier requested access to the electronic locker arrangement. In another example, the identity verification module 520 can generate the QR code based on other information, such as at least one of an identifier of the courier, an identifier of the sender, an identifier of the item, an identifier of the locker storing the item, an identifier of the electronic locker arrangement storing the item, a location of the electronic locker arrangement, or a location of the courier.

In various implementations, the identity verification module 520 can provide the QR code to the electronic locker arrangement that the courier is requesting to access. In additional implementations, the identity verification module 520 can operate in conjunction with the courier communication module 512 to provide the QR code to a computing device of the courier. The identity verification module 520 can then obtain the QR code from a different device than the device that the QR code was initially sent to. That is, in cases where the QR code was sent to the computing device of the courier, the identity verification module 520 can obtain information indicating the QR code from the electronic locker arrangement that the courier is requesting to access. In these situations, the courier can display the QR code on a computing device of the courier and scan the displayed QR code at the electronic locker arrangement. The electronic locker arrangement can then send the QR code or information derived from the QR code to the identity verification module 520 to verify the identity of the courier. In instances where the QR code was first sent to the electronic locker arrangement that the courier is requesting to access, the identity verification module 520 can obtain information associated with the QR code from a computing device of the courier. In these scenarios, the electronic locker arrangement can display the QR code obtained from the identity verification module 520 and the courier can scan the displayed QR code using a computing device. The computing device can then send the QR code or information derived from the QR code back to the identity verification module 520 to verify the identity of the courier.

In response to receiving QR code information, the identity verification module 520 can analyze the information with respect to information stored by the logistics management database 524. In particular, the identity verification module 520 can compare QR code information received from the computing device of the courier or from the electronic locker arrangement and verify whether the QR code information is stored in the logistics management database 524 in association with at least the courier, the item, and the electronic locker arrangement. In cases where the identity verification module 520 determines that the QR code information received from the computing device of the courier or from the electronic locker arrangement corresponds to information stored by the logistics management database 524, the identity verification module 520 can determine that the identity of the courier has been verified.

In illustrative implementations, the identity verification module 520 can receive a request to generate a QR code from an electronic locker arrangement. In some cases, the request can be added to the logistics management queue 526. In response to receiving the request, the identity verification module 520 can generate a QR code and send the QR code to the electronic locker arrangement. Additionally, the identity verification module 520 can store the QR code and/or information encoded by the QR code in the logistics management database 524. In various implementations, the information stored by the logistics management database 524 that is related to the QR code can be stored in association with the item that the courier is attempting to pick up and/or stored in association with at least one data structure that has been created for the delivery of the item in the logistics management database 524. Subsequently, the identity verification module 520 can obtain the QR code or information derived from the QR code from a computing device of the courier. In these cases, the computing device of the courier can scan the QR code displayed by the electronic locker arrangement. In certain implementations, the identity verification module 520 can obtain an identifier that has been derived from the QR code from the computing device of the courier. The identifier can include an identifier of the electronic locker arrangement storing the item or an identifier of the particular locker storing the item. The identity verification module 520 can also receive additional information from the computing device of the courier, such as an identifier of the courier. The identity verification module 520 can access data stored by the logistics management database 524 and determine whether the identifier of the electronic locker arrangement or the identifier of the locker, in addition to other identity verification information obtained from the computing device of the courier, corresponds to the item and the courier assigned to deliver the item. The identity verification module 520 can determine that the identity of the courier has been verified based at least partly on determining that the information received from the computing device of the courier corresponds to information stored by the logistics management database 524 in relation to the item.

In some implementations, the identity verification module 520 can verify the identity of the courier utilizing a bar code. For example, in situations where the courier is dropping off an item for storage at an electronic locker arrangement, a bar code of the item can be utilized to provide access to a locker assigned to the item at the electronic locker arrangement. In some cases, the bar code used to verify the identity of the courier and provide access to the electronic locker arrangement can be the same bar code utilized by the sender to gain access to the electronic locker arrangement where the item was initially dropped off by the sender. In other situations, the bar code utilized to gain access to the electronic locker arrangement by the courier to drop off the item can be different from the initial bar code. In these instances, the identity verification module 520 can generate an additional bar code that the courier can utilize to verify the identity of the courier and access the electronic locker arrangement to drop off the item.

The identity verification module 520 can also verify the identity of a recipient that is picking up an item that is stored by an electronic locker arrangement. In particular implementations, the identity verification module 520 can generate a QR code that can be utilized by the recipient to access a locker storing an item that has been dropped off by a courier. The QR code generated by the identity verification module 520 for the recipient to access the electronic locker arrangement is different from the QR code generated by the identity verification module 520 for the courier to access an additional electronic locker arrangement that previously stored the item. In some cases, the identity verification module 520 can obtain a request indicating that the recipient is attempting to access the locker storing the item. In various implementations, the request can be provided by the electronic locker arrangement storing the item. In other scenarios, the request can be provided via an application executed by a computing device of the recipient. The identity verification module 520 can generate a QR code that uniquely identifies the recipient with respect to the item. For example, the identity verification module 520 can obtain a time related to the item and generate the QR code based at least partly on the time. The time related to the item can include a time that the item was stored in the electronic locker arrangement or a time that the recipient requested access to the electronic locker arrangement. In another example, the identity verification module 520 can generate the QR code based on other information, such as at least one of an identifier of the recipient, an identifier of the sender, an identifier of the item, an identifier of the locker storing the item, an identifier of the electronic locker arrangement storing the item, a location of the electronic locker arrangement, or a location of the recipient.

In various implementations, the identity verification module 520 can provide the QR code to the electronic locker arrangement that the recipient is requesting to access. In additional implementations, the identity verification module 520 can operate in conjunction with the recipient communication module 514 to provide the QR code to a computing device of the recipient. The identity verification module 520 can then obtain the QR code from a different device than the device that the QR code was initially sent to. That is, in cases where the QR code was sent to the computing device of the recipient, the identity verification module 520 can obtain information indicating the QR code from the electronic locker arrangement that the recipient is requesting to access. In these situations, the recipient can display the QR code on a computing device of the recipient and scan the displayed QR code at the electronic locker arrangement. The electronic locker arrangement can then send the QR code or information derived from the QR code to the identity verification module 520 to verify the identity of the recipient. In instances where the QR code was first sent to the electronic locker arrangement that the recipient is requesting to access, the identity verification module 520 can obtain information associated with the QR code from a computing device of the recipient. In these scenarios, the electronic locker arrangement can display the QR code obtained from the identity verification module 520 and the recipient can scan the displayed QR code using a computing device. The computing device can then send the QR code or information derived from the QR code back to the identity verification module 520 to verify the identity of the recipient.

In response to receiving QR code information, the identity verification module 520 can analyze the information with respect to information stored by the logistics management database 524. In particular, the identity verification module 520 can compare QR code information received from the computing device of the recipient or from the electronic locker arrangement and verify whether the QR code information is stored in the logistics management database 524 in association with the recipient, the item, and the electronic locker arrangement. In cases where the identity verification module 520 determines that the QR code information received from the computing device of the recipient or from the electronic locker arrangement corresponds to information stored by the logistics management database 524, the identity verification module 520 can determine that the identity of the recipient has been verified.

In illustrative implementations, the identity verification module 520 can receive a request to generate a QR code from an electronic locker arrangement. In some cases, the request can be added to the logistics management queue 526. In response to receiving the request, the identity verification module 520 can generate a QR code and send the QR code to the electronic locker arrangement. Additionally, the identity verification module 520 can store the QR code and/or information encoded by the QR code in the logistics management database 524. In various implementations, the information stored by the logistics management database 524 that is related to the QR code can be stored in association with the item that the recipient is attempting to pick up and/or stored in association with at least one data structure that has been created for the delivery of the item in the logistics management database 524. Subsequently, the identity verification module 520 can obtain the QR code or information derived from the QR code from a computing device of the recipient. In these cases, the computing device of the recipient can scan the QR code displayed by the electronic locker arrangement. In certain implementations, the identity verification module 520 can obtain an identifier that has been derived from the QR code from the computing device of the recipient. The identifier can include an identifier of the electronic locker arrangement storing the item or an identifier of the particular locker storing the item. The identity verification module 520 can also receive additional information from the computing device of the recipient, such as an identifier of the recipient. The identity verification module 520 can access data stored by the logistics management database 524 and determine whether the identifier of the electronic locker arrangement or the identifier of the locker, in addition to other identity verification information obtained from the computing device of the recipient, corresponds to the item and the recipient assigned to deliver the item. The identity verification module 520 can determine that the identity of the recipient has been verified based at least partly on determining that the information received from the computing device of the recipient corresponds to information stored by the logistics management database 524 in relation to the item.

In situations, where the identity verification module 520 verifies the identity of an individual requesting to access a locker of an electronic locker arrangement, the identity verification module 520 can cause the electronic locker arrangement to provide access to the individual. In some cases, the identity verification module 520 can send a signal to the electronic locker arrangement to open a locker storing the item. In scenarios where the identity verification module 520 is unable to verify the identity of an individual requesting to access a locker of an electronic locker arrangement, the identity verification module 520 can deny access to the electronic locker arrangement by the individual. To illustrate, the identity verification module 520 can send information to the electronic locker arrangement indicating that the identity of the individual requesting access to the electronic locker arrangement has been denied and to keep the door to the locker storing the item closed/locked.

The electronic locker arrangement 110 can include one or more second computing devices 534. The one or more second computing devices 534 can include one or more processors, such as processor 536. The one or more processors 536 can include at least one hardware processor, such as a microprocessor. In some cases, the one or more processors 536 may include a central processing unit (CPU), a graphics processing unit (GPU), or both a CPU and GPU, or other processing units. Additionally, the one or more processors 536 can include a local memory that may store program modules, program data, and/or one or more operating systems.

In addition, the one or more second computing devices 534 can include one or more computer-readable storage media, such as computer-readable storage media 538. The computer-readable storage media 538 can include volatile and nonvolatile memory and/or removable and non-removable media implemented in any type of technology for storage of information, such as computer-readable instructions, data structures, program modules, or other data. Such computer-readable storage media 538 can include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the one or more second computing devices 534, the computer-readable storage media 538 can be a type of tangible computer-readable storage media and can be a non-transitory storage media.

The one or more second computing devices 534 can include one or network interfaces (not shown) to communicate with other computing devices via the one or more networks 508. The one or more networks 508 can include one or more of the Internet, a cable network, a satellite network, a wide area wireless communication network, a wired local area network, a wireless local area network, or a public switched telephone network (PSTN).

The computer-readable storage media 538 can be used to store any number of functional components that are executable by the one or more processors 536. In many implementations, these functional components comprise instructions or programs that are executable by the one or more processors 536 and that, when executed, implement operational logic for performing the operations attributed to the one or more second computing devices 534. Functional components of the one or more second computing devices 534 that can be executed on the one or more processors 536 for implementing the various functions and features related to coordinating and managing the delivery of items utilizing electronic locker arrangements, as described herein, include a locker interface module 540, a locker control module 542, and a system communication module 544.

Additionally, the one or more second computing devices 534 can include one or more input/output devices (not shown). The one or more input/output devices can include a display device, keyboard, a remote controller, a mouse, a printer, audio input/output devices, a speaker, a microphone, a camera, and so forth The one or more second computing devices 534 can also include, or be coupled to, a data store 546 that can include, but is not limited to, RAM, ROM, EEPROM, flash memory, one or more hard disks, solid state drives, optical memory (e.g. CD, DVD), or other non-transient memory technologies. The data store 546 can maintain information that is utilized by the one or more second computing devices 534 to perform operations related to coordinating and managing the pickup and drop off of items stored by the electronic locker arrangement 110. For example, the data store 546 can store sensor data 548 and locker security data 550. The sensor data 548 can include data indicating that doors of the lockers of the electronic locker arrangement 110 are opened or closed, such as data from magnetic sensors coupled to doors of the lockers of the electronic locker arrangement 110. The sensor data 548 can also include image data, video data, and/or audio data captured by input devices of the electronic locker arrangement 110. Additionally, the sensor data 548 can include data obtained by weight sensors disposed in the lockers of the electronic locker arrangement 110. The weight sensors can indicate a weight of an item placed in a locker of the electronic locker arrangement 110. The locker security data 550 can include data utilized to obtain access to the electronic locker arrangement 110. For example, the locker security data 550 can include bar codes, QR codes, identifiers of individuals, identifiers of items, or combinations thereof. In some cases, the bar codes, QR codes, and/or identifiers can be obtained from the logistics management system 108. In additional implementations, the bar codes, QR codes, and/or identifiers can be obtained via one or more input devices of the electronic locker arrangement 110.

The locker interface module 540 can include computer-readable instructions that when executed by the one or more processors 536 can provide one or more user interfaces displayed via one or more display devices of the electronic locker arrangement 110. The locker interface module 540 can generate user interfaces to capture information input by individuals utilizing the electronic locker arrangement 110. In some cases, the user interfaces generated by the locker interface module 540 can obtain information related to requests to store items in the electronic locker arrangement 110. Additionally, the user interfaces generated by the locker interface module 540 can obtain information related to requests to remove items from the electronic locker arrangement 110. The locker interface module 540 can also generate user interfaces that include information used to access items stored by the electronic locker arrangement 110, such as QR codes and/or bar codes.

The locker control module 542 can include computer-readable instructions that when executed by the one or more processors 536 can cause lockers of the electronic locker arrangement 110 to open or close. In some cases, the locker control module 542 can obtain signals from the logistics management system 108 to open or close lockers of the electronic locker arrangement 110. In other cases, the locker control module 542 can cause lockers of the electronic locker arrangement 110 to open or close based on the sensor data 548. For example, the locker control module 542 can determine that an item has been removed from a locker of the electronic locker arrangement 110 based on weight data associated with the locker and proceed to close the door of the locker. In another example, the locker control module 542 can analyze weight data associated with a locker and determine that an item has been placed in the locker.

In particular implementations, the locker interface module 540 and the locker control module 542 can work in conjunction with each other after an item has been dropped off or picked up. For example, after the locker control module 542 determines that an item has been dropped off in a locker of the electronic locker arrangement 110, the locker interface module 540 can generate one or more user interfaces to determine whether a sender or courier has additional items to drop off and to control access to the electronic locker arrangement 110 to drop off the additional items. Additionally, after the locker control module 542 determines that an item has been picked up from a locker of the electronic locker arrangement 110, the locker interface module 540 can generate one or more user interfaces to determine whether a courier or a recipient has additional items to pick up and to control access to the electronic locker arrangement 110 to pick up the additional items.

The system communication module 544 can include computer-readable instructions that when executed by the one or more processors 536 can manage communications to and from the logistics management system 108. For example, the system communications module 544 can provide information obtained via user interfaces displayed by the electronic locker arrangement 110 to the logistics management system 108. In another example, the system communications module 544 can provide sensor data 548 and/or locker security data 550 to the logistics management system 108.

The architecture 500 can also include a computing device 552 operated by a user 554. The computing device 552 can include a mobile phone, a smart phone, a tablet computing device, a laptop computing device, a portable gaming device, a desktop computing device, combinations thereof, and the like. The user 554 can include a sender of an item to be delivered via the logistics management system 108, a courier transporting items being delivered via the logistics management system 108, or a recipient that receives an item delivered via the logistics management system 108.

The computing device 552 can include one or more processors, such as processor 556 and memory 558. The one or more processors 556 can include at least one hardware processor, such as a microprocessor. In some cases, the one or more processors 556 may include a central processing unit (CPU), a graphics processing unit (GPU), or both a CPU and GPU, or other processing units. Additionally, the one or more processors 556 can include a local memory that may store program modules, program data, and/or one or more operating systems.

The memory 558 can include volatile and nonvolatile memory and/or removable and non-removable media implemented in any type of technology for storage of information, such as computer-readable instructions, data structures, program modules, or other data. The computing device 552 can also include one or network interfaces (not shown) to communicate with other computing devices via the one or more networks 508. Additionally, the computing device 552 can include one or more input/output devices (not shown).

The memory 558 can be used to store any number of functional components that are executable by the one or more processors 556. In many implementations, these functional components comprise instructions or programs that are executable by the one or more processors 556 and that, when executed, implement operational logic for performing the operations attributed to the computing device 552. Functional components of the computing device 552 that can be executed on the one or more processors 556 for implementing the various functions and features related to coordinating and managing the delivery of items utilizing electronic locker arrangements, as described herein, can include a logistics app 560.

The logistics app 560 can provide one or more user interfaces to provide information to the user 554 or to obtain information input by the user 554. The logistics app 560 can be utilized by senders to request the delivery of items to recipients. The logistics app 560 can also provide information to couriers regarding items that are available for delivery by the couriers. Couriers can also utilize the logistics app 560 to accept items for delivery. The logistics app 560 can notify recipients of items that have been sent by senders and track the progress of the delivery of items.

In some cases, the logistics app 560 can provide information to access lockers storing items being picked up or dropped off. For example, the logistics app 560 can scan QR codes that can be utilized to access items stored in lockers of electronic locker arrangements. In certain implementations, the logistics app 560 can extract information from the QR codes, such as a locker identifier, and also obtain information about the user 554, such as a user identifier, and provide this information to the logistics management system 108 to obtain access to an electronic locker arrangement. The logistics app 560 can also obtain and display bar codes to open lockers for dropping off items in lockers of electronic locker arrangements.

Figure 6:
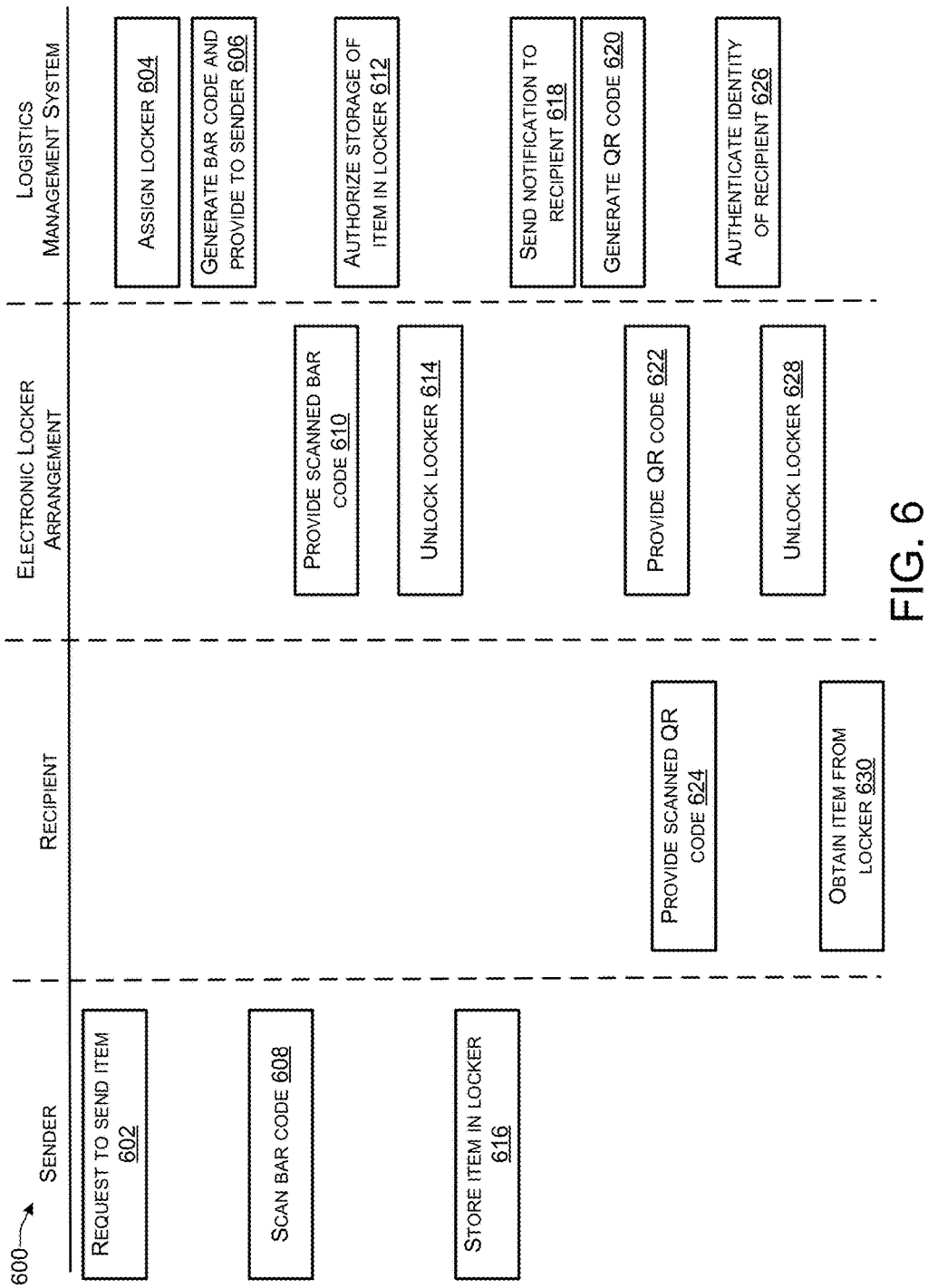
FIG. 6 is a diagram showing the timing of operations performed by various entities to enable an item to be delivered to a recipient from a sender via a single electronic locker arrangement according to some implementations.

FIG. 6 is a diagram showing the timing of operations of a process 600 performed by various entities to enable an item to be delivered to a recipient from a sender via a single electronic locker arrangement according to some implementations. The entities participating in the process 600 include a sender of an item, a recipient of the item, an electronic locker arrangement that stores the item, and a logistics management system that coordinates delivery of the item from the sender to the recipient. At 602, the process 600 includes a sender providing a request to send an item. The request can be provided via a website maintained by the logistics management system or via a logistics app executed by a computing device of the sender. The logistics app can be provided by the logistics management system. At 604, the logistics management system can assign a locker of the electronic locker arrangement to store the item. The locker can be assigned, in some cases, based on dimensions of the locker with respect to dimensions of the item. At 606, the process 600 includes the logistics management system generating a bar code and providing the bar code to the sender. The logistics management system can provide the bar code to the sender via a logistics app executed by a computing device of the sender.

At 608, the sender can scan the bar code at the electronic locker arrangement. For example, the sender can display the bar code using a logistics app executed by a computing device of the sender and operate a bar code scanner of the electronic locker arrangement to scan the bar code. The electronic locker arrangement can provide one or more user interfaces for the sender to control a bar code scanner of the electronic locker arrangement. At 610, the electronic locker arrangement can provide the scanned bar code to the logistics management system and, at 612, the logistics management system can authorize storage of the item in the locker. In some situations, the logistics management system can determine that the bar code scanned at the electronic locker arrangement corresponds to the bar code provided to the sender. In particular implementations, the logistics management system can send information to the electronic locker arrangement indicating that the sender can store the item in a locker of the electronic locker arrangement. The electronic locker arrangement can then, at 614, unlock the locker, and at 616, the sender can place the item in the locker. The logistics management system can determine that the item has been placed in the locker based on information obtained from the electronic locker arrangement.

At 618, the process 600 can include sending a notification to the recipient that the item is available to be picked up at the electronic storage arrangement. At 620, the logistics management system can generate a QR code. In some situations, the logistics management system can generate the QR code in response to a request from the recipient to access the locker storing the item. In other cases, the logistics management system can generate the QR code in response to determining that the item has been stored in the locker. At 622, the electronic locker arrangement can provide the QR code to the recipient. For example, the electronic locker arrangement can display the QR code. The recipient can scan the QR code and, at 624, provide the scanned QR code to the logistics management system. The recipient can scan the QR code via a logistics app executed by a computing device of the recipient. In particular implementations the logistics app can extract information from the QR code, such as an identifier of the locker storing the item, and send the information extracted from the QR code back to the logistics management system. The logistics app can also send additional information to the logistics management system, such as an identifier of the recipient or an identifier associated with the instance of the logistics app executed by the computing device of the recipient.

At 626, the logistics management system can authenticate the identity of the recipient. For example, the logistics management system can utilize the information obtained from the logistics app, such as the locker identifier extracted from the QR code and/or the identifier of the recipient, to authenticate the identity of the recipient. After determining that the recipient is authorized to access the electronic locker arrangement, the electronic locker arrangement can unlock the locker, at 628, and, at 630, the recipient can obtain the item from the locker of the electronic locker arrangement where the item was stored. In certain implementations, the electronic locker arrangement can unlock the locker in response to information received from the logistics management system. The information indicating that the electronic locker arrangement is to unlock the locker can include a control signal to unlock the locker or information indicating that the recipient is authorized to access the locker.

Figure 7:
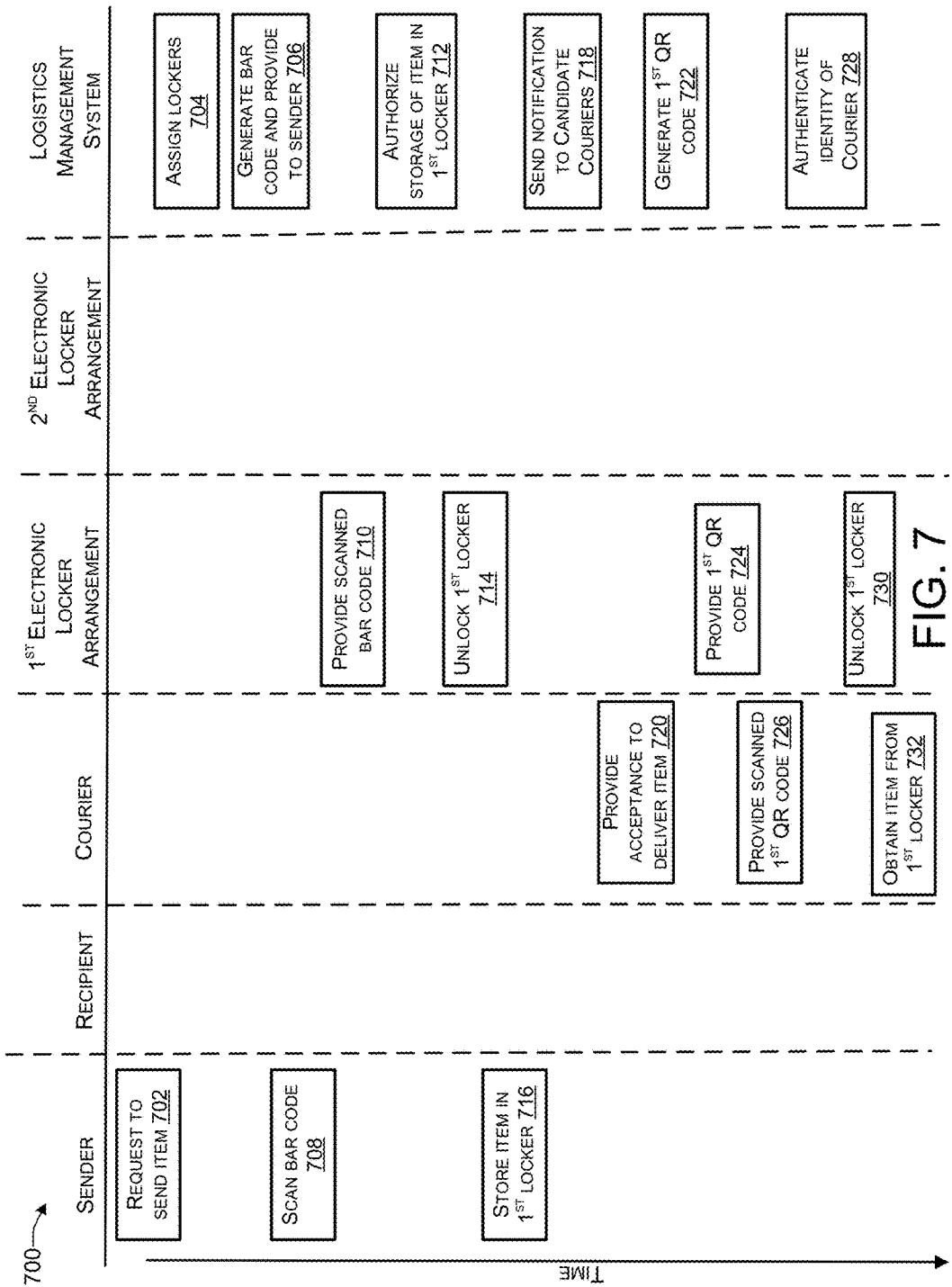
FIG. 7 is a first diagram showing the timing of operations performed by various entities to enable an item to be delivered to a recipient from a sender via a courier utilizing multiple electronic locker arrangements according to some implementations.

FIG. 7 is a first diagram of a process 700 showing the timing of operations performed by various entities to enable an item to be delivered to a recipient from a sender via a courier utilizing multiple electronic locker arrangements according to some implementations. The entities participating in the process 700 include a sender of an item, a recipient of the item, a first electronic locker arrangement and a second electronic storage arrangement that store the item, a courier that transports the item between the first electronic locker arrangement and the second electronic locker arrangement, and a logistics management system that coordinates delivery of the item from the sender to the recipient. At 702, the process 700 includes a sender requesting to send an item to the recipient. At 704, in response to the request to send the item, the logistics management system can assign lockers for the delivery of the item. The logistics management system can assign a first locker to store the item being dropped off by the sender and a second locker to store the item for pickup by the recipient. The first locker can be included in the first electronic locker arrangement and the second locker can be included in the second electronic locker arrangement. In some cases, the first locker and the second locker can be assigned in response to receiving the request to deliver the item and before the item is placed into the first locker or the second locker. In other situations, the second locker can be assigned after the item has been placed into the first locker or after the item has been removed from the first locker.

At 706, the logistics management system can generate a bar code associated with the item and provide the bar code to the sender. At 708, the sender can scan the bar code, such as via a bar code scanner of the first electronic locker arrangement. In particular implementations, the sender can display the bar code via a logistics app executed on a computing device of the sender and control the first electronic locker arrangement using input to one or more user interfaces to scan the displayed car code. At 710, the first electronic locker arrangement can provide the scanned bar code to the logistics management system. In response to receiving the scanned bar code, the logistics management system can, at 712, authorize storage of the item in the first locker of the first electronic storage arrangement. At 714, the first electronic storage arrangement can unlock the locker and, at 716, the sender can store the item in the locker.

At 718, the logistics management system can send notifications to candidate couriers that the item is available to be delivered. The candidate couriers can be determined by the logistics management system based on evaluating a group of couriers with respect to one or more criteria. At 720, the courier can provide an acceptance to deliver the item. At 722, the process 700 includes generating a first QR code. In some cases, the QR code can be generated in response to a request received via the electronic locker arrangement to access the locker storing the item to be delivered. At 724, the electronic locker arrangement can provide the first QR code to the sender, such as displaying the first QR code via a display device of the first electronic locker arrangement. The courier can scan the first QR code and then, at 726, provide the scanned first QR code to the logistics management system. In particular implementations, the scanned first QR code can be provided to the logistics management system via a logistics app executed by a computing device of the courier. In particular implementations the logistics app can extract information from the QR code, such as an identifier of the first locker, and send the information extracted from the first QR code back to the logistics management system. The logistics app can also send additional information to the logistics management system, such as an identifier of the courier or an identifier associated with the instance of the logistics app executed by the computing device of the courier.

At 728, the logistics management system can authenticate the identity of the courier. For example, the logistics management system can utilize the information obtained from the logistics app, such as the first locker identifier extracted from the QR code and/or the identifier of the courier, to authenticate the identity of the courier. After determining that the courier is authorized to access the electronic locker arrangement, the electronic locker arrangement can unlock the locker, at 730, and, at 732, the courier can obtain the item from the first locker of the first electronic locker arrangement where the item was stored. In certain implementations, the electronic locker arrangement can unlock the locker in response to information received from the logistics management system. The second electronic locker arrangement, at 742, unlocks the second locker, and the courier then stores the item in the second locker at 744. At 746, the logistics management system sends a notification to the recipient that the item is stored in the second locker of the second electronic locker arrangement and available to be picked up.

Figure 8:
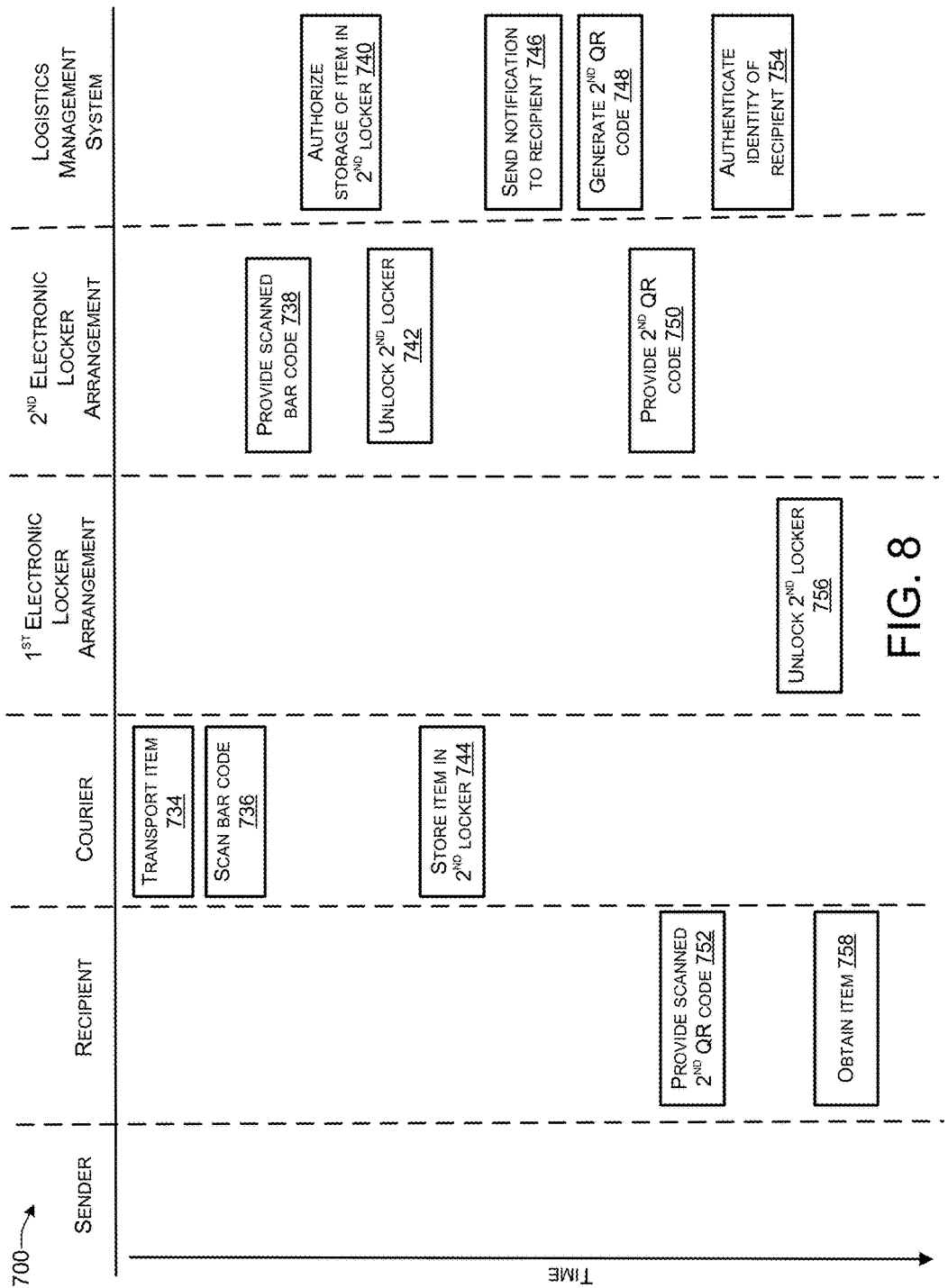
FIG. 8 is a second diagram that continues the operations performed in FIG. 7 showing the timing of operations performed by various entities to enable an item to be delivered to a recipient from a sender via a courier utilizing multiple electronic locker arrangements according to some implementations.

FIG. 8 is a second diagram that continues the operations of the process 700 performed in FIG. 7 showing the timing of operations performed by various entities to enable an item to be delivered to a recipient from a sender via a courier utilizing multiple electronic locker arrangements according to some implementations. At 734, the courier transports the item from the first electronic locker arrangement to the second electronic locker arrangement. At 736, the process 700 includes the courier scanning a bar code of the item at the second electronic locker arrangement. In some cases, the bar code can be the same bar code provided to the sender of the item. At 738, the second electronic locker arrangement provides the scanned bar code to the logistics management system, and after receiving the scanned bar code from the second electronic locker arrangement, the process 700 includes, at 740, authorizing storage of the item in the second locker of the second electronic storage arrangement.

At 742, the second electronic locker arrangement can unlock the second locker. In some cases, the second locker can be unlocked based at least partly on receiving information from the logistics management system. At 744, the courier can store the item in the second locker. Additionally, at 746, the logistics management system can send a notification to the recipient that the item has been stored in the second locker. In certain implementations, the logistics management system can send the notification at least partly based on receiving information from the second electronic locker arrangement that the item has been stored in the second locker. In particular implementations, the courier can receive the notification via a logistics app executed by the computing device of the courier.

At 748, the process 700 can include generating a second QR code. In some cases, the second QR code can be generated in response to a request received via the second electronic locker arrangement to access the second locker storing the item to be delivered. At 750, the electronic locker arrangement can provide the second QR code to the recipient, such as displaying the second QR code via a display device of the second electronic locker arrangement. The recipient can scan the second QR code and then, at 752, provide the scanned second QR code to the logistics management system. In particular implementations, the scanned second QR code can be provided to the logistics management system via a logistics app executed by a computing device of the recipient. In particular implementations the logistics app can extract information from the second QR code, such as an identifier of the second locker, and send the information back to the logistics management system. The logistics app can also send additional information to the logistics management system, such as an identifier of the recipient or an identifier associated with the instance of the logistics app executed by the computing device of the recipient.

At 754, the logistics management system can authenticate the identity of the recipient. For example, the logistics management system can utilize the information obtained from the logistics app, such as the second locker identifier extracted from the second QR code and/or the identifier of the recipient, to authenticate the identity of the recipient. After determining that the recipient is authorized to access the electronic locker arrangement, the electronic locker arrangement can unlock the locker, at 756, and, at 758, the recipient can obtain the item from the second locker of the second electronic locker arrangement where the item was stored. In certain implementations, the electronic locker arrangement can unlock the locker in response to information received from the logistics management system.

FIGS. 9-12 illustrate example processes of delivering items to recipients from senders via electronic locker arrangements. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 9:
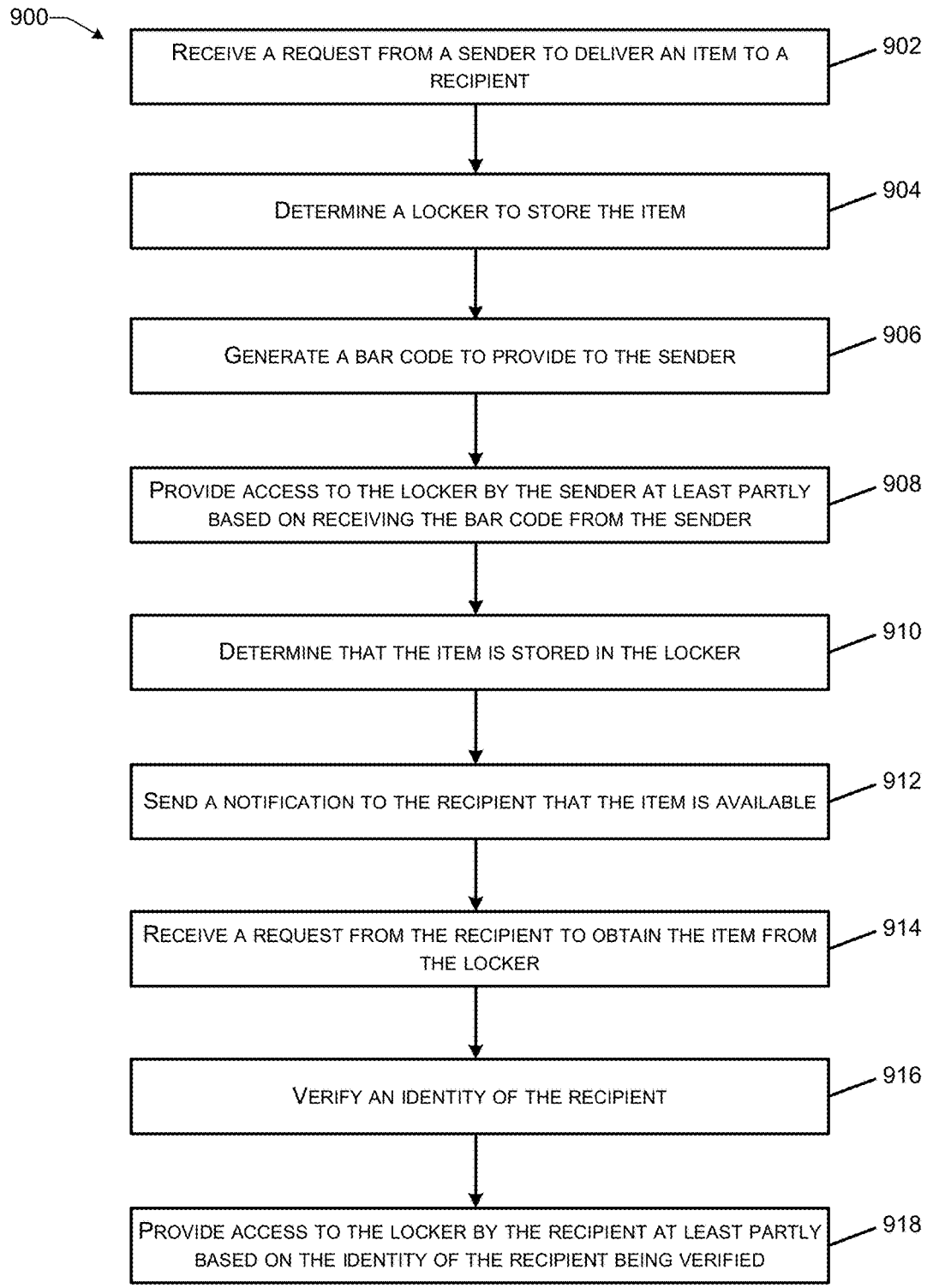
FIG. 9 is a flow diagram of a process to facilitate the delivery of an item from a sender to a recipient via a single electronic locker arrangement according to some implementations.

FIG. 9 is a flow diagram of a process 900 to facilitate the delivery of an item from a sender to a recipient via a single electronic locker arrangement according to some implementations. At 902, the process 900 can include receiving a request from a sender to deliver an item to a recipient. The request can be received from a computing device of the sender. In some cases, the request can be received by a website of a logistics management system, while in other cases, the request can be received by a mobile app executed on the computing device of the recipient.

At 904, the process 900 can include determining a locker to store the item. The locker can be included in an electronic locker arrangement. In some cases, the electronic locker arrangement can be located in a same geographic region as the sender and the recipient. In particular implementations, the electronic locker arrangement, the sender, and the recipient can each be located in a same zip code. In other implementations, the electronic locker arrangement, the sender, and the recipient can be located in a same neighborhood or district. In still additional implementations, the electronic locker arrangement, the sender, and the recipient can be located in a same city, town, village, or other municipality. Determining the locker to store the item can include analyzing dimensions and/or other characteristics of the item in relation to dimensions and/or storage capacity of lockers of the electronic locker arrangement that can have different dimensions and/or storage capacities with respect to one another.

At 906, the process 900 can include generating a bar code to provide to the sender. The bar code can include an identifier of the sender and/or an identifier of the item. In particular implementations, the bar code can be provided to a computing device of the sender. In other situations, the bar code can be accessible to the sender via a web site that can be accessed by a computing device of the sender. At 908, access can be provided to the locker by the sender at least partly based on receiving the bar code or information encoded by the bar code from the sender. In some cases, the bar code or information encoded by the bar code received from the sender can be compared against the bar code initially provided to the sender. In response to determining that the bar code received from the sender corresponds to the bar code initially sent to the sender, the sender can be authorized to access the locker.

At 910, the process 900 can include determining that the item is stored in the locker. In particular implementations, sensor data associated with the locker can be utilized to determine that the item has been stored in the locker. At 912, the process 900 can include sending a notification to the recipient that the item is available for pickup at the electronic locker arrangement. In some cases, the notification can be provided to a computing device of the recipient. The notification can be provided to the recipient via an account of the recipient with a service provider implementing a logistics management system. Information associated with the account of the recipient with the service provider can be accessible to the recipient via a website of the service provider, a mobile app executed by a computing device of the recipient, or both.

At 914, the process 900 can include receiving a request from the recipient to obtain the item from the locker. In some cases, the request can be provided via one or more user interfaces displayed at the electronic locker arrangement, while in other cases, the request can be provided via a mobile app executed by a computing device of the recipient. Additionally, at 916, the process 900 can include verifying an identity of the recipient, and, at 918, the process 900 includes providing access to the locker by the recipient at least partly based on the identity of the recipient being verified. In particular implementations, the identity of the recipient can be verified utilizing a QR code provided to the recipient that uniquely identifies the recipient with respect to the item.

The operations of the process 900 can be implemented by one or more computing devices. In some situations, the operations of the process 900 can be implemented by an electronic locker arrangement. In other scenarios, the operations of the process 900 can be implemented by a logistics management system. In still other implementations, the operations of the process 900 can be implemented by both an electronic locker arrangement and a logistics management system.

Figure 10:
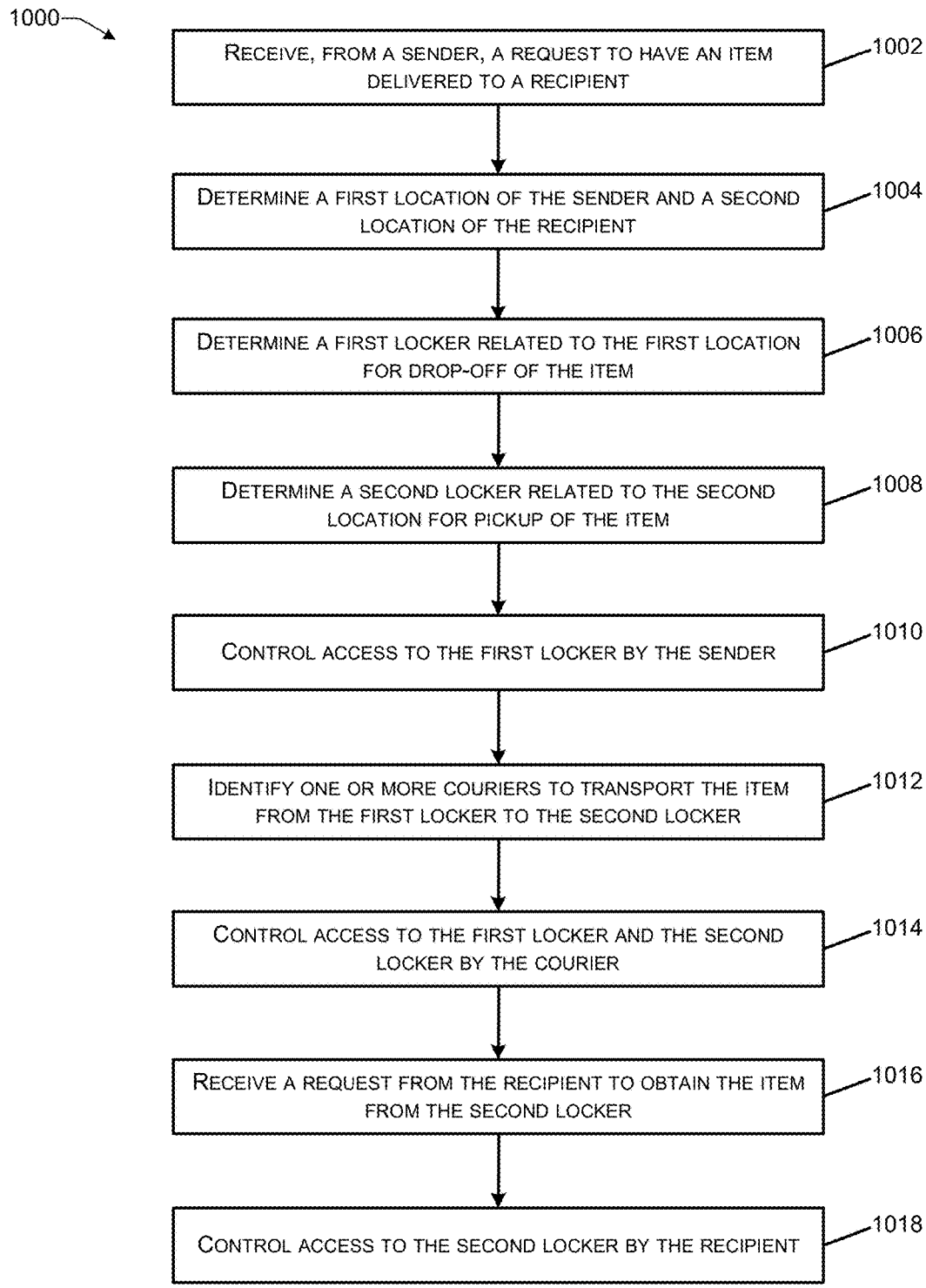
FIG. 10 is a flow diagram of a process to facilitate the delivery of an item from a sender to a recipient via multiple electronic locker arrangements according to some implementations.

FIG. 10 is a flow diagram of a process 1000 to facilitate the delivery of an item from a sender to a recipient via multiple electronic locker arrangements according to some implementations. At 1002, the process 1000 can include receiving, from a sender, a request to have an item delivered to a recipient. The request can be received from a computing device of the sender. In some cases, the request can be received by a web site of a logistics management system, while in other cases, the request can be received by a mobile app executed on the computing device of the sender.

At 1004, the process 1000 can include determining a first location of the sender and a second location of the recipient. The first location and the second location can be determined based on information included in the request. In other situations, the first location and the second location can be determined based on GPS information received from computing devices of the sender and the recipient. In certain implementations, the first location can include a first geographic area and the second location can include a second geographic area. In particular implementations, the first location can include a first zip code and the second location can include a second zip code. In additional implementations, the first location can include a first neighborhood or first district and the second location can include a second neighborhood or second district. In further implementations, the first location can include a first municipal or political region (e.g., city, state, territory, village, town, county, etc.) and the second location can include a second municipal or political region. In other implementations, the first location can include a first geographic region specified by a logistics management system and the second location can include a second geographic region specified by the logistics management system. To illustrate, the logistics management system can divide a geographical area into a number of regions. In particular implementations, the regions can have shapes with dimensions expressed in feet, meters, kilometers, miles, or combinations thereof. The shapes of the regions can be regular shapes (e.g., square, rectangle, circle), in some scenarios, and irregular in other instances.

At 1006, the process 1000 can include determining a first locker related to the first location for drop-off of the item by the sender, and, at 1008, the process 1000 includes determining a second locker related to the second location for pickup of the item by the recipient. The first locker can be included in a first electronic locker arrangement located in the first location and the second locker can be included in a second electronic locker arrangement located in the second location. In some cases, the first electronic locker arrangement and the second electronic locker arrangement can be owned and/or operated by a service provider of the logistics management system. In other situations, at least one of the first electronic locker arrangement and the second electronic locker arrangement can be owned and/or operated by a service provider that is different from the service provider of the logistics management system. At 1010, the process 1000 can include controlling access to the first locker by the sender. In some cases, the sender can access the first locker in response to the sender providing an identifier to the logistics management system. The identifier can be provided via a logistics app executed on a computing device of the sender or via the first electronic locker arrangement. In certain implementations, the identifier can be encoded by a bar code of the item.

At 1012, the process 1000 can include identifying one or more couriers to transport the item from the first locker to the second locker. In various implementations, the one or more couriers can be identified based on one or more criteria. The one or more criteria can include location of the couriers with respect to the first location and the second location, ratings of the couriers, number of items assigned to be delivered by the couriers, and so forth. The courier can also be identified based at least partly on an availability indicated by the courier to deliver items to the first location and the second location. In certain situations, multiple couriers can be identified to deliver the item to the recipient. In particular implementations, the first location and the second location can be different cities, countries, or regions and one or more intermediate electronic locker arrangements can be determined to store the item. In these scenarios, a first courier can be identified for the first location and a second courier can be identified for the second location. Further, one or more additional couriers can be identified to transport the item between one or more intermediate electronic locker arrangements between the first location and the second location.

At 1014, the process 1000 can include controlling access to the first locker and the second locker by the courier. The access to the first locker and the second locker can be based at least partly on verifying the identity of the courier at the first location and the second location. In some cases, the identity of the courier can be determined based on identifiers provided to the courier, such as via a logistics app executed by a computing device of the courier or via an account of the courier with a logistics management system that is accessible via a website of the logistics management system. The identifiers can include or be encoded by bar codes, QR codes, alphanumeric strings, image data, biometric data, combinations thereof, and the like. The identifiers can also be unique to the courier with respect to the item.

At 1016, the process 1000 can include receiving a request from the recipient to obtain the item from the second locker. In particular implementations, the recipient can request to obtain the item from the second locker after receiving a notification that the item is available to be picked up at the second locker. At 1018, the process 1000 can include controlling access to the second locker by the recipient. The access to the second locker can be based at least partly on verifying the identity of the recipient at the second location. In some cases, the identity of the recipient can be determined based on identifiers provided to the recipient, such as via a logistics app executed by a computing device of the recipient or via an account of the recipient with a logistics management system that is accessible via a web site of the logistics management system. The identifiers can include bar codes, QR codes, alphanumeric strings, image data, biometric data, combinations thereof, and the like. The identifiers can be unique to the recipient with respect to the item.

The operations of the process 1000 can be implemented by one or more computing devices. In some situations, the operations of the process 1000 can be implemented by one or more electronic locker arrangements. In other scenarios, the operations of the process 1000 can be implemented by a logistics management system. In still other implementations, the operations of the process 1000 can be implemented by one or more electronic locker arrangements and a logistics management system.

Figure 11:
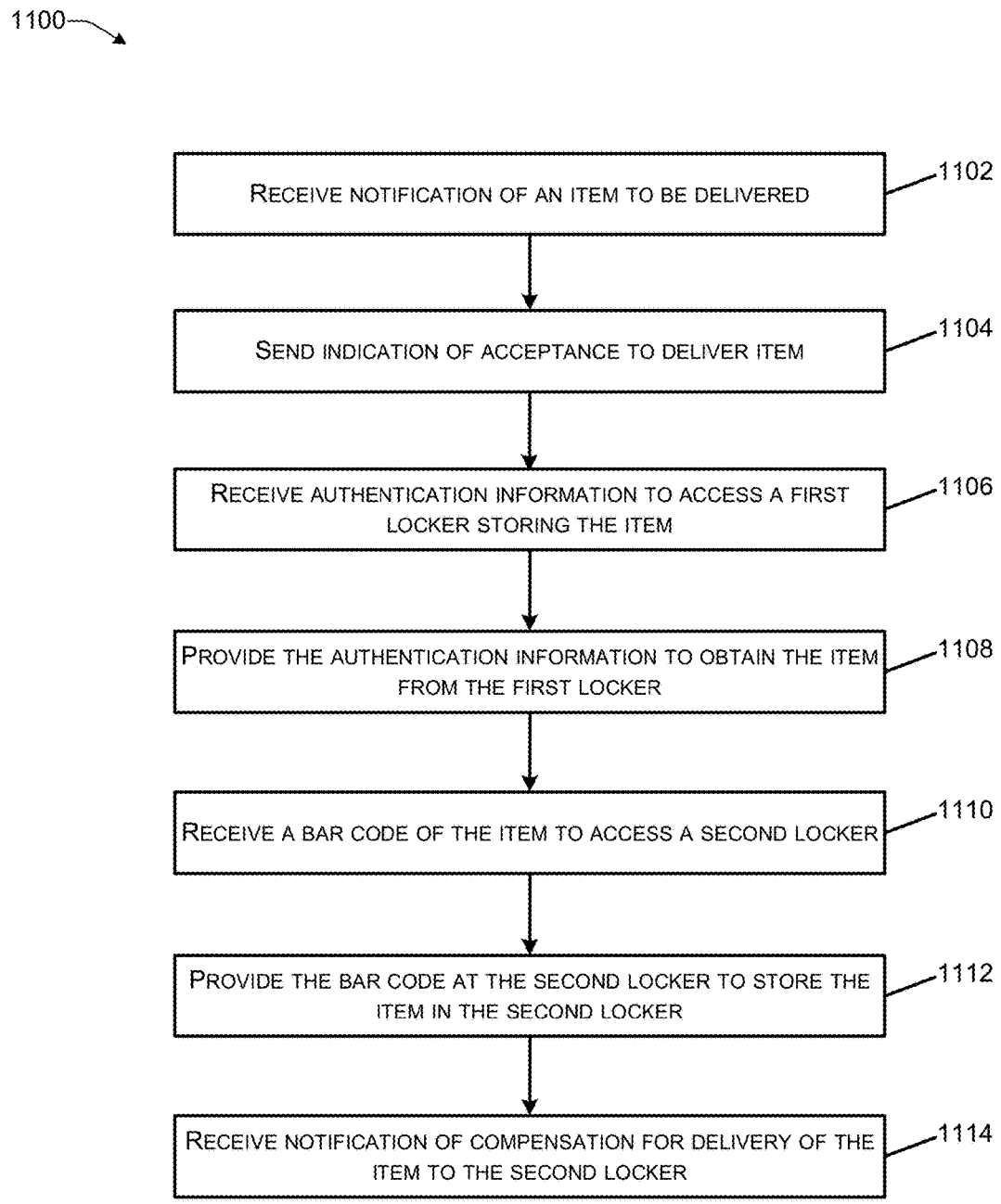
FIG. 11 is a flow diagram of a process to facilitate the delivery of an item from a recipient to a sender via a courier using an application executed by a computing device of the courier according to some implementations.

FIG. 11 is a flow diagram of a process 1100 to facilitate the delivery of an item from a recipient to a sender via a courier using an application executed by a computing device of the courier according to some implementations. At 1102, the process 1100 can include receiving notification of an item to be delivered. The notification can be provided by a logistics app executed by a computing device of the courier. In some implementations, the notification can include information about the item, such as a description of the item, dimensions of the item, a type of the item, and so forth. The notification can also include a first location for the courier to pick up the item and a second location for the courier to drop off the item. At 1104, the process 1100 can include sending an indication of acceptance to deliver the item. The acceptance to deliver the item can be sent via a logistics app executed by the computing device of the courier.

At 1106, the process 1106 can include receiving authentication information to access a first locker storing the item. In some cases, the authentication information can be encoded by a QR code. At 1108, the process 1100 can include providing the authentication information to obtain the item from the first locker. In some implementations, the authentication information can be extracted from the QR code by a logistics app executed by a computing device of the courier. In particular cases, the authentication information can include an identifier of the first locker or an identifier of the first electronic locker arrangement that includes the first locker. The logistics app can also provide additional information for the courier to obtain access to the item at the first locker, such as an identifier of the courier. The identifier of the courier can be associated with an account of the courier with a logistics management system.

At 1110, the process 1100 can include receiving a bar code to access the second locker, and, at 1112, the process 1100 can include providing the bar code at the second locker to store the item in the second locker. The bar code can encode an identifier of the item, in some situations. Additionally, the bar code can be displayed via the logistics app and scanned by an electronic locker arrangement that includes the second locker. At 1114, the process 1100 can include receiving notification of compensation for delivery of the item to the second locker. In particular implementations, the courier can receive payment for the delivery of the item and the computing device of the courier can receive the notification that an account of the courier has been credited the payment. In some cases, the payment to the courier can be based at least partly on a type of item delivered by a courier. Also, the payment to the courier can be based at least partly on a timing of the delivery of the item, such as within a specified period of time or by a specified deadline. Further, the payment to the courier can be based at least partly on a rating of the courier.

Figure 12:
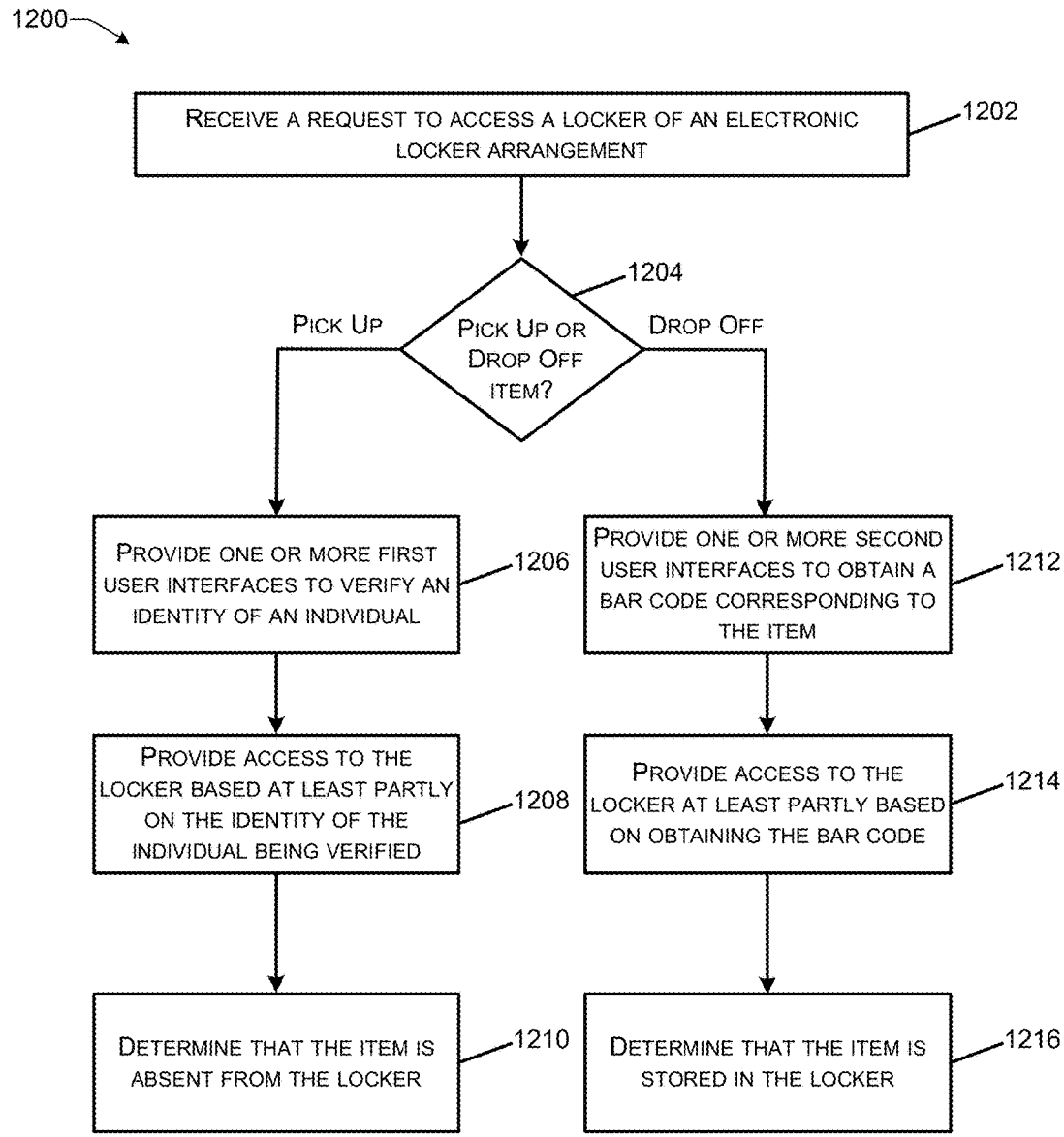
FIG. 12 is a flow diagram of a process to facilitate access to an electronic locker arrangement for the delivery of an item from a sender to a recipient.

FIG. 12 is a flow diagram of a process 1200 to facilitate access to an electronic locker arrangement for the delivery of an item from a sender to a recipient. At 1202, the process 1200 can include receiving a request to access a locker of an electronic locker arrangement. In some cases, the request can be provided via one or more user interfaces displayed by the electronic locker arrangement. In other situations, the request can be received via a logistics app executed by a computing device of an individual, such as a sender of an item, a recipient of an item, or a courier. At 1204, the process 1200 can include determining whether the item is to be picked up or dropped off. When the item is to be picked up, the process 1200 can move to 1206. When the item is to be dropped off, the process 1200 can move to 1212.

At 1206, the process 1200 can include providing one or more first user interfaces to verify an identity of the individual requesting to access the electronic locker arrangement. In some cases, the one or more first user interfaces can be used to display a QR code that can be scanned by a computing device of the individual. In some cases, the QR code can be obtained by the electronic locker arrangement from a logistics management system. At 1208, the process 1200 can include providing access to the locker based at least partly on the identity of the individual being verified. For example, the electronic locker arrangement can receive information from the logistics management system indicating that the identity of the individual has been verified. The electronic locker arrangement can unlock the locker to provide access to the locker by the individual. At 1210, the process 1200 can include determining that the item is absent from the locker. In some situations, the electronic locker arrangement can determine that the item is absent from the locker based at least partly on sensor data. The sensor data can indicate that the door of the locker has been closed. The sensor data can also include weight sensor data indicating that the item has been removed from the locker based at least partly on a change in the weight detected by the weight sensors. In addition, the sensor data can include image data and/or video data indicating that the item has been removed from the locker. In particular implementations, the electronic locker arrangement can provide one or more additional user interfaces to repeat the process for an additional item to be picked up at the electronic locker arrangement. For each item picked up at the electronic locker arrangement a different QR code can be provided that uniquely identifies the individual picking up the item with respect to the item. In this way, different QR codes can be provided for the same individual picking up different items.

At 1212, the process 1200 can include providing one or more user interfaces to obtain a bar code corresponding to the item. In particular implementations, the one or more second user interfaces can be used to scan a bar code from a computing device of the individual. At 1214, the process 1200 can include providing access to the locker at least partly based on obtaining the bar code. In certain implementations, access can be provided to the locker based at least partly on receiving information from a logistics management system indicating that the bar code corresponds to the bar code assigned to the item by the logistics management system. At 1216, the process 1200 can include determining that the item is stored in the locker. In some situations, the electronic locker arrangement can determine that the item is stored in the locker based at least partly on sensor data. The sensor data can indicate that the door of the locker has been closed. The sensor data can also include weight sensor data indicating that the item has been placed into the locker based at least partly on a change in the weight detected by the weight sensors. In addition, the sensor data can include image data and/or video data indicating that the item has been placed in the locker. In particular implementations, the electronic locker arrangement can provide one or more additional user interfaces to repeat the process for an additional item to be dropped off at the electronic locker arrangement. For each item dropped off at the electronic locker arrangement a different QR code can be provided that uniquely identifies the individual dropping off the item with respect to the item. In this way, different QR codes can be provided for the same individual dropping off different items.

Figure 13:
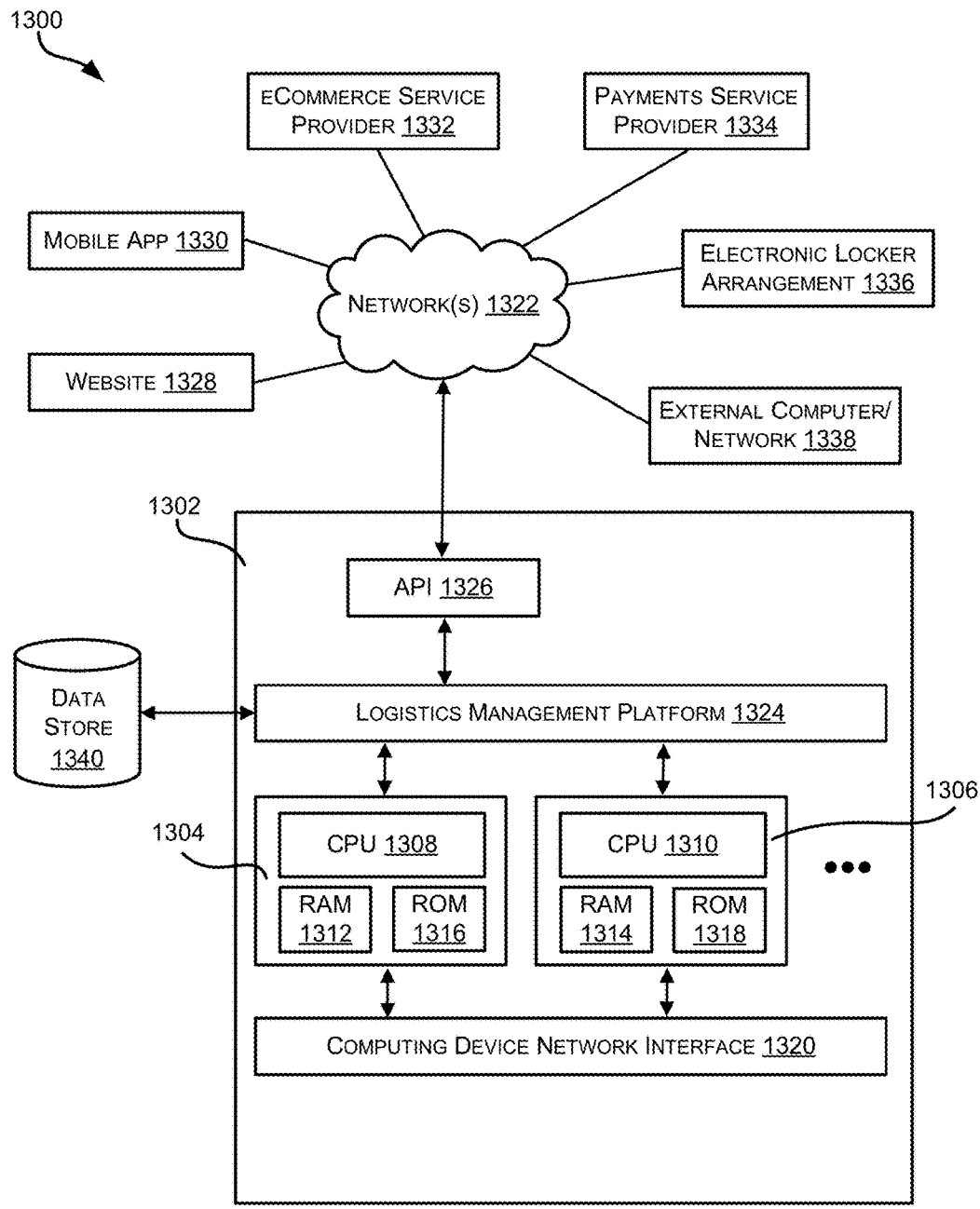
FIG. 13 is a diagram showing an illustrative computer architecture for implementing aspects of the various technologies presented herein.

FIG. 13 is a diagram showing an illustrative computer architecture for implementing aspects of the various technologies presented herein. The architecture 1300 can include a computing system that includes hardware devices that implement software components. In the illustrative example of FIG. 13, the computing system 1302 can include a number of computing devices, such as a first computing device 1304 and a second computing device 1306.

The computing devices 1304, 1306 can include a baseboard, or "motherboard," which is a printed circuit board to which a multitude of components or devices can be connected by way of a system bus or other electrical communication paths. In one illustrative configuration, the computing device 1304, 1306 each include one or more central processing units ("CPUs") 1308, 1310. The CPUs 1308, 1310 can be standard programmable processors that perform arithmetic and logical operations necessary for the operation of the computing system 1300.

The CPUs 1308, 1310 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The computing devices 1304, 1306 also include RAM 1312, 1314, used as the main memory in the computing devices 1304, 1306. The computing devices 1304, 1306 can further include a computer-readable storage medium such as read-only memory ("ROM") 1316, 1318 or non-volatile RAM ("NVRAM") for storing basic routines that help to startup the computing devices 1304, 1306 and to transfer information between the various components and devices. The ROM 1316, 1318 or NVRAM can also store other software components necessary for the operation of the computing devices 1304, 1306 in accordance with the configurations described herein. The computing device network interface 1320 can provide an interface between computing devices of the computing system 1302, such as the first computing device 1304 and the second computing device 1306.

The computing system 1302 can operate in a networked environment using logical connections to remote computing devices and computer systems through one or more networks, such as the network(s) 13022. The computing system 1302 can utilize hardware components, such as one or more network interfaces, to communicate via the network(s) 1322. The computing system 1302 can also utilize software components, such as a logistics management platform 1324 and an API 1326 to communicate with, control, or otherwise interact with various computing devices via the network(s) 1322. The logistics management platform 1324 can implement the operations described herein corresponding to the logistics management system 108. In some implementations, the logistics management platform 1324 can include modules 1510, 1512, 1514, 1516, 1518, 1520 of FIG. 5 and perform the operations described in relation to the processes 600, 700, 800, 900, 1000, 1100, 1200 of FIGS. 6-12. Additionally, the logistics management platform 1324 can perform operations described with respect to at least portions of the architectures 100, 200, 300, 400 of FIG. 1-4 and other implementations described herein. The API 1326 can include various calls and additional information to enable communications between the computing system 1302 and additional computing devices via the network(s) 1322. In particular implementations, the API 1326 can include a representational state transfer (RESTful) API.

The logistics management platform 1324 can exchange information with one or more websites 1328 via the API 1326 in addition to one or more mobile apps 1330. Additionally, the logistics management platform 1324 can exchange information with an ecommerce service provider 1332 as well as a payments service provider 1334 via the API 1326. Further, the logistics management platform can exchange information with electronic locker arrangements 1336 and other external computers/networks 1338 utilizing the API 1326. In some cases, the items being delivered via the logistics management platform 1324 can be obtained via the ecommerce service provider 1332 and/or websites 1328 related to merchants offering items for purchase online. Further, couriers can obtain payments for their services in delivering items via the payments service provider 1334.

The computing system 1302 can be connected to a mass storage device 1340 that provides non-volatile storage for the computing system 1302. The mass storage device 1340 can consist of one or more physical storage units. A storage controller of the computing system 1302 (not shown) can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing system 1302 can store data on the mass storage device 1340 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1340 is characterized as primary or secondary storage, and the like.

For example, the computing system 1302 can store information to the mass storage device 13140 by issuing instructions through a storage controller to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing system 1302 can further read information from the mass storage device 1340 by detecting the physical states or characteristics of one or more particular locations within the physical storage units.

In addition to the mass storage device 1340 described above, the computing system 1302 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing system 1302.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 1340 or other computer-readable storage media is encoded with computer-executable instructions which, when loaded into the computing devices 1304, 1306 of the computing system 1302, transform the computer from a general-purpose computing system into a special-purpose computer capable of implementing the configurations described herein. These computer-executable instructions transform the computing devices 1304, 1306 by specifying how the CPUs 1308, 1310 transition between states, as described above. According to one configuration, the computing system 1302 has access to computer-readable storage media storing computer-executable instructions which, when executed by the computing system 1302, perform the various processes described above with regard to FIGS. 1-12. The computing system 1302 can also include computer-readable storage media for performing any of the other computer-implemented operations described herein.

The computing devices 1304, 1306 can include one or more input/output controllers for receiving and processing input from a number of input devices, such as a keyboard, a mouse, a touchpad, a touch screen, an electronic stylus, or other type of input device. Similarly, an input/output controller can provide output to a display, such as a computer monitor, a flat-panel display, a digital projector, a printer, or other type of output device. It will be appreciated that the computing system 1302 might not include all of the components shown in FIG. 13, can include other components that are not explicitly shown in FIG. 13, or can utilize an architecture completely different than that shown in FIG. 13.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
   one or more processors; and
   at least one non-transitory computer-readable storage medium having instructions stored thereupon which, when executed by the one or more processors, cause the system to perform operations comprising:
      receiving, from a first computing device of a sender, a request for delivery of an item to a recipient;
      determining a first location of the sender and a second location of the recipient;
      determining a first electronic locker arrangement located in the first location and a second electronic locker arrangement located in the second location;
      determining a first locker included in the first electronic locker arrangement to store the item and a second locker included in the second electronic locker arrangement to store the item;
      determining locations of candidate couriers based at least partly on information indicating an availability of individual couriers of the candidate couriers to deliver items from the first location to the second location;
      providing, to the candidate couriers, access to a notification indicating that the item is available for delivery;
      receiving one or more acceptances from at least a subset of the candidate couriers;
      determining, based at least partly on one or more criteria, a courier from among the subset of candidate couriers to transport the item from the first electronic locker arrangement to the second electronic locker arrangement;
      receiving, from the first electronic locker arrangement, a request to obtain a quick response (QR) code, wherein the request is based on input received at the first locker arrangement to access the first electronic locker arrangement;
      determining an identifier of the first locker and a time of the request;
      generating the QR code that encodes at least the identifier of the first locker;
      providing the QR code to the first electronic locker arrangement;
      receiving, from a computing device of the courier, the identifier of the first locker and an identifier of the courier, wherein the QR code is scanned by the computing device of the courier from the first electronic locker arrangement and the identifier of the first locker is extracted from the QR code by the computing device of the courier;
      determining that the courier is authorized to access the first locker by parsing a database using the identifier of the first locker and the identifier of the courier to identify at least one data structure indicating that the courier is assigned to pick up the item from the first locker; and
      providing, to the first electronic locker arrangement, additional information granting access to the first locker by the courier.

2. The system of claim 1, wherein the operations further comprise:

generating an additional QR code that encodes at least an identifier of the second locker;
providing the additional QR code to the second electronic locker arrangement;
receiving, from an additional computing device of the recipient, the identifier of the second locker and an identifier of the recipient;
determining that the recipient is authorized to access the second locker by parsing the database using the identifier of the second locker and the identifier of the recipient to identify at least one additional data structure indicating that the sender has requested for the item to be delivered to the recipient; and
providing, to the second electronic locker arrangement, additional information granting access to the second locker by the recipient.

3. The system of claim 1, wherein the operations further comprise:
sending, to a computing device of the sender, a bar code that encodes the identifier of the item;
obtaining, via the first electronic locker arrangement, the identifier of the item;
sending, to the first electronic locker arrangement, additional information indicating that the sender is authorized to access the first locker; and
determining that the item has been placed in the first locker.

4. The system of claim 1, wherein the operations further comprise:
sending, to the computing device of the courier, an identifier of the item;
obtaining, via the second electronic locker arrangement, the identifier of the item;
sending, to the second electronic locker arrangement, additional information indicating that the courier is authorized to access the second locker; and
determining that the item has been placed in the second locker.

5. The system of claim 1, wherein the QR code is generated based at least partly on a time of the request to obtain the QR code.

6. The system of claim 1, wherein the first location includes a first zip code and the second location includes a second zip code different from the first zip code.

7. The system of claim 1, wherein the one or more criteria include ratings of the courier, number of items assigned to the courier for delivery, types of items previously delivered by the courier, location of the courier in relation to the first electronic locker arrangement and the second electronic locker arrangement, time that the courier provided an acceptance, or combinations thereof.

8. A system, comprising:
one or more processors; and
at least one non-transitory computer-readable storage medium having instructions stored thereupon which, when executed by the one or more processors, cause the apparatus to perform operations comprising:
receiving, from an electronic locker arrangement, a request for a quick response (QR) code, wherein the request is based on input received at the electronic locker arrangement to access the electronic locker arrangement;
determining an identifier of a locker of the electronic locker arrangement and a time of the request;
generating the QR code such that the QR code encodes the identifier of the locker and the time of the request;
providing the QR code to the electronic locker arrangement;
receiving, from a computing device of an individual requesting to access the locker, the identifier of the locker and an identifier of the individual, wherein the QR code is scanned by the computing device of the individual from the electronic locker arrangement and the identifier of the locker is extracted from the QR code by the computing device of the individual;
determining that the individual is authorized to access the locker by parsing a database using the identifier of the individual and the identifier of the locker to identify at least one data structure indicating that the individual is authorized to access the locker;
providing information to the electronic locker arrangement indicating that the individual is authorized to access the locker; and
obtaining, from the electronic locker arrangement, additional information indicating that an item has been removed from the locker.

9. The system of claim 8, wherein the electronic locker arrangement is a first electronic locker arrangement, the QR code is a first QR code, the request is a first request, the time of the request is a first time, the individual is a first individual, the locker is a first locker, the computing device is a first computing device, and the operations further comprise:
receiving, from a second electronic locker arrangement, a second request for a second QR code;
determining an identifier of a second locker of the second electronic locker arrangement and a second time of the second request;
generating the second QR code based at least partly on the identifier of the second locker and the second time of the second request, wherein the second QR code is different from the first QR code;
receiving, from a second computing device of a second individual requesting to access the second locker, the identifier of the second locker and an identifier of the second individual;
determining that the second individual is authorized to access the second locker by parsing the database using the identifier of the second individual and the identifier of the second locker to identify at least one additional data structure indicating that the second individual is authorized to access the second locker;
providing additional information to the second electronic locker arrangement indicating that the second individual is authorized to access the second locker; and
obtaining, from the second electronic locker arrangement, further information indicating that the item has been removed from the second locker.

10. The system of claim 9, wherein the first individual is a courier assigned to deliver the item from the first electronic locker arrangement to the second electronic locker arrangement and the second individual is a recipient of the item.

11. The system of claim 8, wherein the operations further comprise:
receiving, from the electronic locker arrangement, an additional request for an additional QR code;
determining a time of the additional request and an identifier of an additional locker of the electronic locker arrangement;
generating the additional QR code based at least partly on the identifier of the additional locker and the time of the additional request, wherein the additional QR code is different from the QR code;

receiving, from the computing device of the individual, the identifier of the additional locker and the identifier of the individual;

determining that the individual is authorized to access the additional locker by parsing the database using the identifier of the individual and the identifier of the additional locker to identify at least one additional data structure indicating that the individual is authorized to access the additional locker;

providing additional information to the electronic locker arrangement indicating that the individual is authorized to access the additional locker; and obtaining, from the electronic locker arrangement, further information indicating that an additional item has been removed from the additional locker.

12. The system of claim 8, wherein the operations further comprise:

receiving a request for the item to be delivered from a first location to a second location;

determining that the electronic locker arrangement is located in the first location and that an additional electronic locker arrangement is located in the second location;

determining that the locker is available to store the item based at least partly on dimensions of the locker in relation to dimensions of the item; and determining a courier from among a plurality of couriers to transport the item from the electronic locker arrangement to the additional electronic locker arrangement.

13. A computer-implemented method comprising:

receiving, from a first computing device of a sender, a request for delivery of an item to a recipient;

determining a first location of the sender and a second location of the recipient;

determining a first electronic locker arrangement located in the first location and a second electronic locker arrangement located in the second location;

determining a first locker included in the first electronic locker arrangement to store the item and a second locker included in the second electronic locker arrangement to store the item;

determining locations of candidate couriers based at least partly on information indicating an availability of individual couriers of the candidate couriers to deliver items from the first location to the second location;

providing, to the candidate couriers, access to a notification indicating that the item is available for delivery;

receiving one or more acceptances from at least a subset of the candidate couriers;

determining, based at least partly on one or more criteria, a courier from among the subset of candidate couriers to transport the item from the first electronic locker arrangement to the second electronic locker arrangement;

receiving, from the first electronic locker arrangement, a request for a quick response (QR) code, wherein the request is based on input received at the first electronic locker arrangement to access the first electronic locker arrangement;

determining an identifier of the first locker;

generating the QR code that encodes at least the identifier of the first locker;

providing the QR code to the first electronic locker arrangement;

receiving, from a computing device of the courier, the identifier of the first locker and an identifier of the courier, wherein the QR code is scanned by the computing device of the courier from the first electronic locker arrangement and the identifier of the first locker is extracted from the QR code by the computing device of the courier;

determining that the courier is authorized to access the first locker by parsing a database using the identifier of the first locker and the identifier of the courier to identify at least one data structure indicating that the courier is assigned to pick up the item from the first locker; and providing, to the first electronic locker arrangement, additional information granting access to the first locker by the courier.

14. The computer-implemented method of claim 13, wherein:

the second locker is determined based at least partly on determining that the item is absent from the first locker; and the method further comprises:

determining that the item is stored in the second locker; and making a notification accessible to the recipient indicating that the item is available to be picked up at the second locker.

15. The computer-implemented method of claim 14, wherein determining that the item is absent from the first locker is based at least partly on first sensor data obtained from the first electronic locker arrangement and determining that the item is stored in the second locker is based at least partly on second sensor data obtained from the second electronic locker arrangement.

16. The computer-implemented method of claim 14, further comprising:

determining a location of the item based at least partly on Geographic Positioning System (GPS) data obtained from a mobile device of the courier after determining that the item is absent from the first locker;

determining an estimate of a time period for delivery of the item based at least partly on the location of the item and the location of the second electronic locker arrangement; and making an additional notification available to the recipient indicating the location of the item and the time period for delivery of the item.

17. The computer-implemented method of claim 13, further comprising:

obtaining authentication information from the second electronic locker arrangement; and verifying an identity of the recipient based at least partly on the authentication information.

18. The computer implemented method of claim 17, wherein the authentication information includes a bar code, an alphanumeric code, biometric data, or combinations thereof.

19. The computer-implemented method of claim 13, wherein a logistics application executed by the computing device of the courier performs operations comprising:

determining an identifier of the courier; and sending the identifier of the first locker and the identifier of the courier to a logistics management system.

20. The computer-implemented method of claim 13, wherein:

the first location is determined at least partly based on first input obtained from the sender indicating the first location; and the second location is determined at least partly based on second input obtained from the sender indicating the second location.

* * * * *